United States Patent
Wallentin et al.

(10) Patent No.: US 12,531,625 B2
(45) Date of Patent: Jan. 20, 2026

(54) BEAM FAILURE DETECTION AND RECOVERY FOR DEACTIVATED SECONDARY CELL GROUP (SCG)

(71) Applicant: Telefonaktiebolaget LM Ericsson (publ), Stockholm (SE)

(72) Inventors: Pontus Wallentin, Linköping (SE); Zhenhua Zou, Solna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 98 days.

(21) Appl. No.: 18/703,744

(22) PCT Filed: Oct. 7, 2022

(86) PCT No.: PCT/SE2022/050902
§ 371 (c)(1),
(2) Date: Apr. 23, 2024

(87) PCT Pub. No.: WO2023/080818
PCT Pub. Date: May 11, 2023

(65) Prior Publication Data
US 2025/0007596 A1    Jan. 2, 2025

Related U.S. Application Data

(60) Provisional application No. 63/274,609, filed on Nov. 2, 2021.

(51) Int. Cl.
*H04B 7/06* (2006.01)
*H04B 7/08* (2006.01)
*H04W 76/18* (2018.01)

(52) U.S. Cl.
CPC ......... *H04B 7/06964* (2023.05); *H04B 7/088* (2013.01); *H04W 76/18* (2018.02)

(58) Field of Classification Search
CPC .... H04B 7/06964; H04B 7/088; H04W 76/18
See application file for complete search history.

(56) References Cited

U.S. PATENT DOCUMENTS

| | | |
|---|---|---|
| 10,965,434 B1 | 3/2021 | Babaei |
| 2019/0215896 A1 | 7/2019 | Zhou et al. |

(Continued)

FOREIGN PATENT DOCUMENTS

| | | |
|---|---|---|
| EP | 3525516 A1 | 8/2019 |
| WO | 2020028792 A1 | 2/2020 |

(Continued)

OTHER PUBLICATIONS

"[AT113-e][230][eDCCA] Solution alternatives for SCG activation and deactivation (Huawei)", 3GPP TSG-RAN WG2#113-e, R2-2101966, Online, Jan. 25-Feb. 5, 2021, pp. 1-33.

(Continued)

*Primary Examiner* — Jaison Joseph
(74) *Attorney, Agent, or Firm* — Murphy, Bilak & Homiller, PLLC

(57) ABSTRACT

Embodiments include methods for a user equipment (UE) configured to communicate with a radio access network (RAN) via a master cell group (MCG) and a secondary cell group (SCG). Such methods include, while the SCG is deactivated, performing beam failure detection (BFD) for at least one cell in the SCG, according to a first BFD configuration. Such methods include, in response to detecting an initial beam failure in the deactivated SCG, transmitting a first message indicating the initial beam failure to a RAN node configured to provide the MCG; and in response to detecting one or more subsequent beam failures in the deactivated SCG, refraining from transmitting to the RAN any messages indicating the one or more subsequent beam failures (e.g., until receiving another BFD configuration). Other embodiments include complementary methods for a (Continued)

RAN node, as well as UEs and RAN nodes configured to perform such methods.

20 Claims, 14 Drawing Sheets

(56) References Cited

U.S. PATENT DOCUMENTS

| | | | |
|---|---|---|---|
| 2020/0120522 A1 | 4/2020 | Xiao et al. | |
| 2020/0314880 A1 | 10/2020 | Cirik et al. | |
| 2020/0351771 A1 | 11/2020 | Geekie et al. | |
| 2021/0160126 A1 | 5/2021 | Cirik et al. | |
| 2021/0175955 A1* | 6/2021 | Kung | H04W 72/1263 |
| 2022/0007256 A1 | 1/2022 | Ozturk et al. | |
| 2022/0007446 A1 | 1/2022 | Purkayastha et al. | |
| 2022/0022065 A1 | 1/2022 | Wang et al. | |
| 2022/0052906 A1 | 2/2022 | Awoniyi-oteri et al. | |
| 2022/0124514 A1 | 4/2022 | Lee et al. | |
| 2022/0225457 A1* | 7/2022 | Purkayastha | H04W 76/18 |
| 2022/0394583 A1 | 12/2022 | Deenoo et al. | |
| 2023/0189039 A1 | 6/2023 | Turtinen et al. | |
| 2023/0232259 A1 | 7/2023 | Awoniyi-oteri et al. | |
| 2023/0262501 A1 | 8/2023 | Rugeland et al. | |
| 2023/0275802 A1 | 8/2023 | Awoniyi-oteri et al. | |
| 2023/0276279 A1 | 8/2023 | Kim | |
| 2023/0337020 A1* | 10/2023 | Da Silva | H04B 7/088 |
| 2023/0362817 A1 | 11/2023 | Da Silva | |
| 2023/0371109 A1* | 11/2023 | Jang | H04B 17/328 |
| 2024/0073984 A1* | 2/2024 | Wu | H04W 76/19 |
| 2025/0007596 A1* | 1/2025 | Wallentin | H04W 76/15 |

FOREIGN PATENT DOCUMENTS

| | | |
|---|---|---|
| WO | 2020033542 A1 | 2/2020 |
| WO | 2020047080 A1 | 3/2020 |
| WO | 2020067806 A1 | 4/2020 |
| WO | 2020150991 A1 | 7/2020 |
| WO | 2020156156 A1 | 8/2020 |
| WO | 2020167203 A1 | 8/2020 |
| WO | 2020198746 A1 | 10/2020 |
| WO | 2021067236 A1 | 4/2021 |
| WO | 2022071848 A1 | 4/2022 |

OTHER PUBLICATIONS

"3GPP TS 36.300 V16.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Sep. 2020, pp. 1-390.

"3GPP TS 38.101-4 V16.1.0", 3rd Generation Partnership Project; Technical Specification Group Radio Access Network; NR; User Equipment (UE) radio transmission and reception; Part 4: Performance requirements (Release 16), Jun. 2020, pp. 1-271.

"BFD on dormant SCell", 3GPP TSG-RAN WG2 Meeting #109e, R2-2000678, Elbonia, Feb. 24-Mar. 6, 2020, 1 page.

"Discussion on SCG deactivation and activation", 3GPP TSG-RAN WG2 Meeting #113 electronic, R2-2100136, Online, Jan. 25-Feb. 5, 2021, pp. 1-14.

"Draft Letter to ITU in reply to ITU_R_WP5D_TEMP_39 = RP-200037 on update submission for LTE-Advanced towards Revision 5 of Recommendation ITU-R M.2012", 3GPP TSG RAN Meeting #89e; RP-201432; Electronic Meeting, Sep. 14-18, 2020, pp. 1-4.

"Efficient SCG activation/deactivation in MR-DC", 3GPP TSG-RAN WG2 Meeting #111-e; R2-2007748; E-meeting, Aug. 17-28, 2020, pp. 1-5.

"Email report of [AT109e][046][DCCA] Fast SCell Activation (Oppo)", 3GPP TSG-RAN WG2 Meeting #109 electronic; R2-2002224, Feb. 24-Mar. 6, 2020, pp. 1-31.

"Email report of [AT110e][052][DCCA] Fast Scell Activation (OPPO)", 3GPP TSG-RAN WG2 Meeting #110; R2-2006079; Electronic, Jun. 1-12, 2020, pp. 1-13.

"Framework of SCG deactivation and activation", 3GPP TSG-RAN WG2 Meeting #111 electronic, R2-2006900, e-meeting, Aug. 17-28, 2020, pp. 1-6.

"Introduction of dormancy behavior in NR", 3GPP TSG-RAN WG2 Meeting #108, R2-1914552, Reno, USA, Nov. 18-22, 2019, pp. 1-10.

"Remaining issues on NR physical downlink control channel", 3GPP TSG RAN WG1 Meeting #94bis R1-1810339 Chengdu, China,, Oct. 8-12, 2018, pp. 1-11.

"UE measurements and reporting in deactivated SCG", 3GPP TSG-RAN WG2 Meeting #115-e, R2-2107423, Online, Revision of R2-2103893, Aug. 9-27, 2021, pp. 1-9.

"UE Power Saving Techniques", 3GPP TSG-RAN WG 1 Meeting #96, R1-1902771, Athens, Greece, Feb. 25-Mar. 1, 2019, pp. 1-15.

"3GPP TS 38.133 V16.4.0", 3rd Generation Partnership Project; Technical Specification Group Radio Access Network; NR; Requirements for support of radio resource management (Release 16), Jun. 2020, pp. 1-1463.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.0.0, Dec. 2019, pp. 1-366.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V16.2.0, Jul. 2020, pp. 1-390.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.6.0, Jun. 2021, pp. 1-88.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.1.0, Jul. 2020, pp. 1-141.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.2.0, Jul. 2020, pp. 1-1081.

"3rd Generation Partnership Project; Technical Specification Group Radio Access Network; NR; Medium Access Control (MAC) protocol specification (Release 16)", 3GPP TS 38.321 V16.6.0, Sep. 2021, pp. 1-158.

"3rd Generation Partnership Project; Technical Specification Group Radio Access Network; NR; Physical channels and modulation (Release 16)", 3GPP TS 38.211 V16.2.0, Jun. 2020, pp. 1-131.

"3rd Generation Partnership Project; Technical Specification Group Radio Access Network; NR; Physical layer procedures for control (Release 16)", 3GPP TS 38.213 V16.2.0, Jun. 2020, pp. 1-176.

"3rd Generation Partnership Project; Technical Specification Group Radio Access Network; NR; Physical layer procedures for data (Release 15)", 3GPP TS 38.214 V15.0.0, Dec. 2017, pp. 1-71.

"3rd Generation Partnership Project; Technical Specification Group Radio Access Network; NR; Radio Resource Control (RRC) protocol specification (Release 15)", 3GPP TS 38.331 V15.1.0, Mar. 2018, pp. 1-268.

"3rd Generation Partnership Project; Technical Specification Group Radio Access Network; NR; Radio Resource Control (RRC) protocol specification (Release 16)", 3GPP TS 38.321 V16.1.0, Jul. 2020, pp. 1-151.

"3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

"3rd Generation Partnership Project; Technical Specification Group Radio Access Network; NR; Radio Resource Control (RRC) protocol specification (Release 16)", 3GPP TS 38.331 V16.6.0, Sep. 2021, pp. 1-961.

(56) References Cited

OTHER PUBLICATIONS

"3rd Generation Partnership Project; Technical Specification Group Radio Access Network; Study on New Radio Access Technology; Radio Interface Protocol Aspects (Release 14)", 3GPP TR 38.804 V14.0.0, Mar. 2017, pp. 1-57.

"3rd Generation Partnership Project; Technical Specification Group Services and System Aspects; System architecture for the 5G System (5GS); Stage 2 (Release 16)", 3GPP TS 23.501 V16.6.0, Sep. 2020, pp. 1-447.

"Views on NR Rel-17", 3GPP TSG RAN Meeting #84, RP-190919, Newport Beach, USA, Jun. 4, 2019, pp. 1-36.

"Report of 3GPP TSG RAN WG2 meeting #113bis-e, Online", 3GPP TSG-RAN WG2 meeting #114-2, R2-2104xxx, Apr. 12-20, 2021, pp. 1-279.

"Report of 3GPP TSG RAN2#107bis meeting, Chongqing, China", 3GPP TSG-RAN WG2 meeting #108, R2-1914301, Oct. 14-18, 2019, pp. 1-283.

"Introducing suspension of SCG", 3GPP TSG RAN WG2 Meeting #107, R2-1908679, Prague, Czech, Aug. 26-30, 2019, pp. 1-4.

"Report on LTE legacy, Mobility, DCCA, Multi-SIM and RAN slicing", 3GPP TSG-RAN WG2 Meeting #113 bis electronic, R2-2104301, Online, Apr. 12-20, 2021, pp. 1-38.

Nokia, Nokia Shanghai Bell, "On fast deactivation/activation of one SG and Scells", 3GPP TSG RAN WG2 #111-e, R2-2007068, Elbonia, Aug. 17-28, 2020.

Ericsson, "Efficient SCG (de)activation", 3GPP TSG-RAN WG2 #112e, R2-2010062, Electronic meeting, Nov. 2-13, 2020.

Ericsson, "UE measurements and reporting in deactivated SCG", 3GPP TSG RAN WG2 #115-e R2-2108389, Aug. 9-27, 2021.

\* cited by examiner

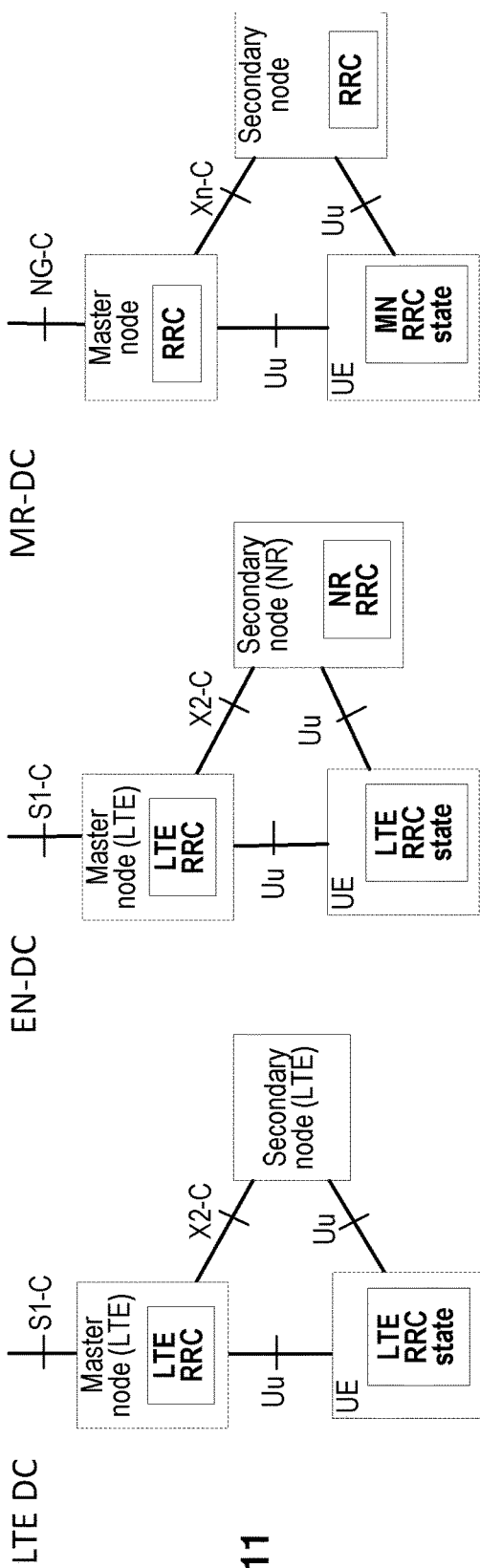
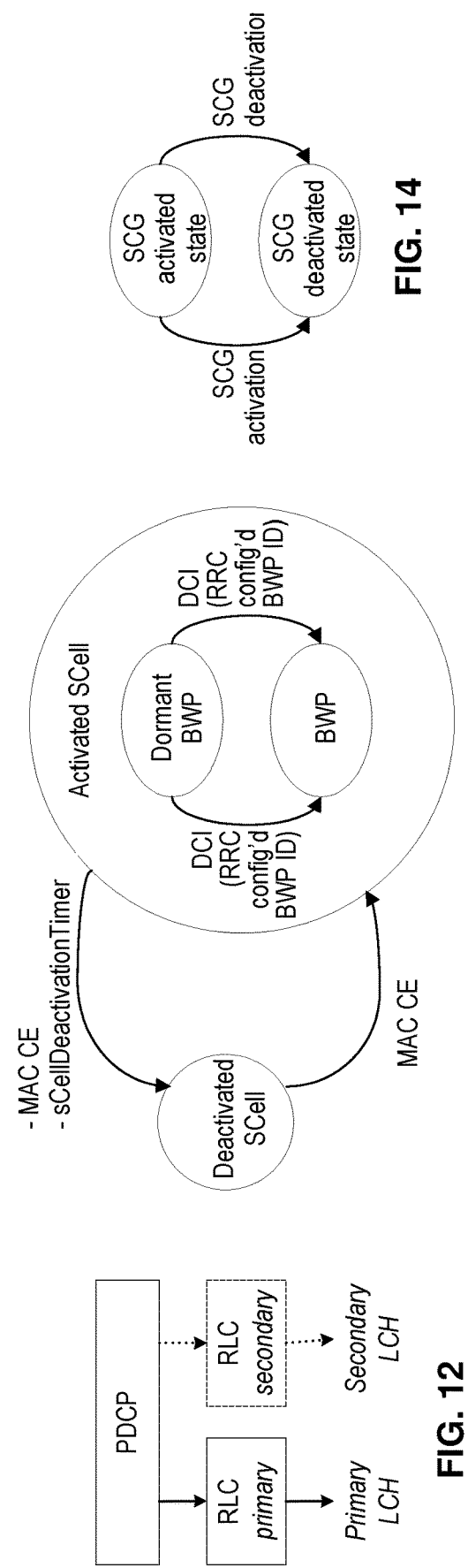
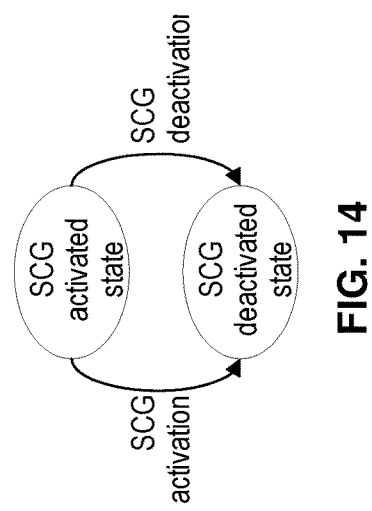
FIG. 11
FIG. 12
FIG. 13
FIG. 14

```
RadioLinkMonitoringConfig ::=            SEQUENCE {
    failureDetectionResourcesToAddModList  SEQUENCE (SIZE(1..maxNrofFailureDetectionResources)) OF RadioLinkMonitoringRS
                                                                                                   OPTIONAL, -- Need N
    failureDetectionResourcesToReleaseList SEQUENCE (SIZE(1..maxNrofFailureDetectionResources)) OF RadioLinkMonitoringRS-Id
                                                                                                   OPTIONAL, -- Need N
    beamFailureInstanceMaxCount            ENUMERATED {n1, n2, n3, n4, n5, n6, n8, n10}
                                                                                                   OPTIONAL, -- Need R
    beamFailureDetectionTimer              ENUMERATED {pbfd1, pbfd2, pbfd3, pbfd4, pbfd5, pbfd6, pbfd8, pbfd10}
                                                                                                   OPTIONAL, -- Need R
    ...
}
RadioLinkMonitoringRS ::=    SEQUENCE {
    radioLinkMonitoringRS-Id   RadioLinkMonitoringRS-Id,
    purpose                    ENUMERATED {beamFailure, rlf, both},
    detectionResource          CHOICE {
        ssb-Index                  SSB-Index,
        csi-RS-Index               NZP-CSI-RS-ResourceId
    },
    ...
}
```

FIG. 15

```
BeamFailureRecoveryConfig ::= SEQUENCE {
    rootSequenceIndex-BFR        INTEGER (0..137)                OPTIONAL, -- Need M
    rach-ConfigBFR               RACH-ConfigGeneric              OPTIONAL, -- Need M
    rsrp-ThresholdSSB            RSRP-Range                      OPTIONAL, -- Need M
    candidateBeamRSList          SEQUENCE (SIZE(1..maxNrofCandidateBeams)) OF PRACH-ResourceDedicatedBFR
                                                                                 OPTIONAL, -- Need M
    ssb-perRACH-Occasion         ENUMERATED{oneEighth, oneFourth, oneHalf, one, two, four, eight, sixteen} OPTIONAL, -- Need M
    ra-ssb-OccasionMaskIndex     INTEGER (0..15)                 OPTIONAL, -- Need M
    recoverySearchSpaceId        SearchSpaceId                   OPTIONAL, -- Need R
    ra-Prioritization            RA-Prioritization               OPTIONAL, -- Need R
    beamFailureRecoveryTimer     ENUMERATED {ms10, ms20, ms40, ms60, ms80, ms100, ms150, ms200}
                                                                                 OPTIONAL, -- Need M
    ...,
    [[
    msg1-SubcarrierSpacing       SubcarrierSpacing               OPTIONAL, -- Need M
    ]],
    [[
    ra-PrioritizationTwoStep-r16     RA-Prioritization OPTIONAL, -- Need R
    candidateBeamRSListExt-v1610     SetupRelease{ CandidateBeamRSListExt-r16 } OPTIONAL -- Need M
    ]]
}
```

FIG. 16

BEAM FAILURE DETECTION AND RECOVERY FOR DEACTIVATED SECONDARY CELL GROUP (SCG)

TECHNICAL FIELD

The present disclosure relates generally to wireless networks and more specifically to techniques that reduce energy consumed by a user equipment (UE) when connected to multiple cell groups in a wireless network, particularly when one of the cell groups is in a deactivated state.

BACKGROUND

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. While the present disclosure relates primarily to 5G/NR, the following description of fourth-generation Long-Term Evolution (LTE) technology is provided to introduce various terms, concepts, architectures, etc. that are also used in 5G/NR.

LTE is an umbrella term that refers to radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that can communicate with 3GPP-standard-compliant network equipment, including E-UTRAN as well as UTRAN and/or GERAN, as the third generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

3GPP LTE Rel-10 supports carrier aggregation (CA) for bandwidths larger than 20 MHz. For backward compatibility with LTE Rel-8, a wideband LTE Rel-10 carrier (e.g., wider than 20 MHz) appears as multiple carriers ("component carriers" or CCs) to a Rel-8 ("legacy") UE. However, Rel-10 UEs can use CA to receive all CCs of a wideband carrier. LTE Rel-12 introduced dual connectivity (DC) whereby a UE is connected to two network nodes simultaneously, thereby improving connection robustness and/or capacity. In LTE DC, these two network nodes are referred to as "Master eNB" (MeNB) and "Secondary eNB" (SeNB), or more generally as master node (MN) and secondary node (SN).

More specifically, a UE is configured with a Master Cell Group (MCG) associated with the MeNB and a Secondary Cell Group (SCG) associated with the SeNB. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the primary cell of the SCG (PSCell) depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

5G/NR technology shares many similarities with 4G/LTE. For example, both PHYs utilize similar arrangements of time-domain physical resources into 1-ms subframes that include multiple slots of equal duration, with each slot including multiple OFDM-based symbols.

Several DC (or more generally, multi-connectivity) scenarios have been considered for NR. These include NR-DC that is similar to LTE-DC discussed above, except that both the MN and SN (referred to as "gNBs") employ the NR interface to communicate with a UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

In addition to providing coverage via "cells," as in LTE, NR networks also provide coverage via "beams." In general, a DL "beam" is a coverage area of a network-transmitted RS that may be measured or monitored by a UE. Such RS can include any of the following, alone or in combination: SS/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of RRC state, while other RS (e.g., CSI-RS, DMRS, PTRS) are associated with specific UEs that have a network connection, i.e., in RRC_CONNECTED state.

NR Rel-15 introduced beam failure detection (BFD) and beam failure recover (BFR). The network configures a UE with BFD reference signals (e.g., SSB or CSI-RS) to be monitored, and the UE declares beam failure when a quantity of beam failure indications from PHY reaches a configured threshold before a configured timer expires. After BFD, the UE initiates a RA procedure on the PCell and selects a suitable beam to perform BFR. If the serving RAN node provides dedicated RA resources for certain beams, the UE will prioritize those.

To improve network energy efficiency and battery life for UEs in MR-DC, 3GPP Rel-17 includes a work item for efficient SCG/SCell activation/deactivation. This can be especially important for MR-DC configurations with NR SCG since, in some cases, NR UE energy consumption is three-to-four times higher than in LTE. As part of this work, it has been agreed that the UE performs BFD in a deactivated SCG only the network configures it to do so.

SUMMARY

However, when the UE detects a beam failure for the PSCell of a deactivated SCG, it is unclear what action the UE should perform. For example, it is unclear whether the UE should perform BFR in the same way as for an activated SCG, or if different procedures should be used. Furthermore, it is unclear to what extent any such BFR procedures will affect energy consumption of the UE.

Embodiments of the present disclosure provide specific improvements to BFD and BFR for UEs operating in a RAN, such as by facilitating solutions to overcome exemplary problems summarized above and described in more detail below.

Embodiments of the present disclosure include methods (e.g., procedures) for a UE configured to communicate with a RAN via an MCG and an SCG.

These exemplary methods can include, while the SCG is deactivated, performing BFD for at least one cell in the SCG, according to a first BFD configuration. These exemplary methods can also include, in response to detecting an initial beam failure in the deactivated SCG, transmitting a first message indicating the initial beam failure to a RAN node configured to provide the MCG. These exemplary methods can also include, in response to detecting one or more subsequent beam failures (i.e., after the initial beam failure) in the deactivated SCG, refraining from transmitting to the RAN any messages indicating the one or more subsequent beam failures.

In some embodiments, the UE can refrain from transmitting messages indicating any subsequent beam failures detected in the deactivated SCG after the initial beam failure, until receiving another BFD configuration from the RAN node configured to provide the MCG. In some of these embodiments, these exemplary methods can also include the following operations:

after detecting the one or more subsequent beam failures, receiving a second BFD configuration from the RAN node configured to provide the MCG;

detecting a further beam failure in the deactivated SCG based on performing BFD according to the second BFD configuration; and transmitting a second message indicating the further beam failure to the RAN node configured to provide the MCG.

In some of these embodiments, the second BFD configuration is received from the RAN node in response to transmitting the first message to the RAN node. In some of these embodiments, each of the first and second messages is an SCGFailureInformation message including a failure type field that indicates beam failure for deactivated SCG. In some variants, each of the first and second messages includes measurements results for one or more beams, including a beam for which failure was detected.

In some embodiments, each of the first and second BFD configurations includes one or more of the following settings or parameters:

an indication of whether the UE should perform BFD on at least one cell in the SCG while the SCG is deactivated;

an indication of whether the UE should send a message in the MCG upon detecting beam failure for at least one cell in the SCG;

an indication for the UE to start or stop BFD for the SCG; and an indication of which measurement results the UE should include in a message indicating at least one beam failure detected in the SCG.

In some variants, the second BFD configuration includes one or more settings or parameters that differ from corresponding settings or parameters of the first BFD configuration.

In some embodiments, these exemplary methods can also include receiving an indication that the SCG is deactivated from the RAN node configured to provide the MCG. In such case, performing the BFD is responsive to the indication from the RAN node.

Other embodiments include methods (e.g., procedures) for a RAN node configured to provide an MCG for a UE that is also configured with an SCG in the RAN.

These exemplary methods can include, while the SCG is deactivated, receiving from the UE a first message indicating an initial beam failure detected by the UE in the deactivated SCG based on a first BFD configuration. These exemplary methods can also include, while the SCG is deactivated and without receiving any messages indicating one or more subsequent beam failures detected by the UE in the deactivated SCG based on the first BFD configuration, transmitting to the UE a second BFD configuration for the SCG.

In some embodiments, these exemplary methods can also include receiving from the UE a second message indicating a further beam failure detected by the UE in the deactivated SCG based on the second BFD configuration. In some of these embodiments, each of the first and second messages is an SCGFailureInformation message including a failure type field that indicates beam failure for deactivated SCG. In some variants, each of the first and second messages includes measurements results for one or more beams, including a beam for which failure was detected.

In some embodiments, each of the first and second BFD configurations includes one or more of the following settings or parameters:

- an indication of whether the UE should perform BFD on at least one cell in the SCG while the SCG is deactivated;
- an indication of whether the UE should send a message in the MCG upon detecting beam failure for at least one cell in the SCG;
- an indication for the UE to start or stop BFD for the SCG; and
- an indication of which measurement results the UE should include in a message indicating at least one beam failure detected in the SCG.

In some variants, the second BFD configuration includes one or more settings or parameters that differ from corresponding settings or parameters of the first BFD configuration.

In some embodiments, sending the second BFD configuration to the UE is responsive to receiving the first message from the UE. In some embodiments, these exemplary methods can also include transmitting to the UE an indication that the SCG is deactivated. In such case, the first message is received after (e.g., in response to) transmitting the indication.

Other embodiments include UEs (e.g., wireless devices, IoT devices, etc. or component(s) thereof) and RAN nodes (e.g., base stations, eNBs, gNBs, ng-eNBs, en-gNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can provide various benefits and/or advantages. For example, since a beam failure condition often occurs for an extended duration, a UE may detect this as multiple beam failure events over the duration. Embodiments enable the UE to report the beam failure condition to the network only once for the duration, or until the network provides a new BFD configuration to the UE. This can reduce the amount of signaling due to beam failures, reduce network load, and reduce UE energy consumption These and other objects, features, and advantages of embodiments of the present disclosure will become apparent upon reading the following Detailed Description in view of the Drawings briefly described below.

BRIEF DESCRIPTION OF THE DRAWINGS

FIG. 11 is a block diagram showing a high-level comparison of CP architectures in LTE DC, EN-DC, and MR-DC using a 5G core network (5GC).

FIG. 12 illustrates an exemplary packet data convergence protocol (PDCP) duplication scheme.

FIG. 13 shows an exemplary state transition diagram for NR SCells.

FIG. 14 is an exemplary SCG state transition diagram.

FIGS. 15-16 show ASN.1 data structures for exemplary RadioLinkMonitoringConfig and BeamFailureRecoveryConfig information elements (IEs), respectively.

DETAILED DESCRIPTION

Figure 1:
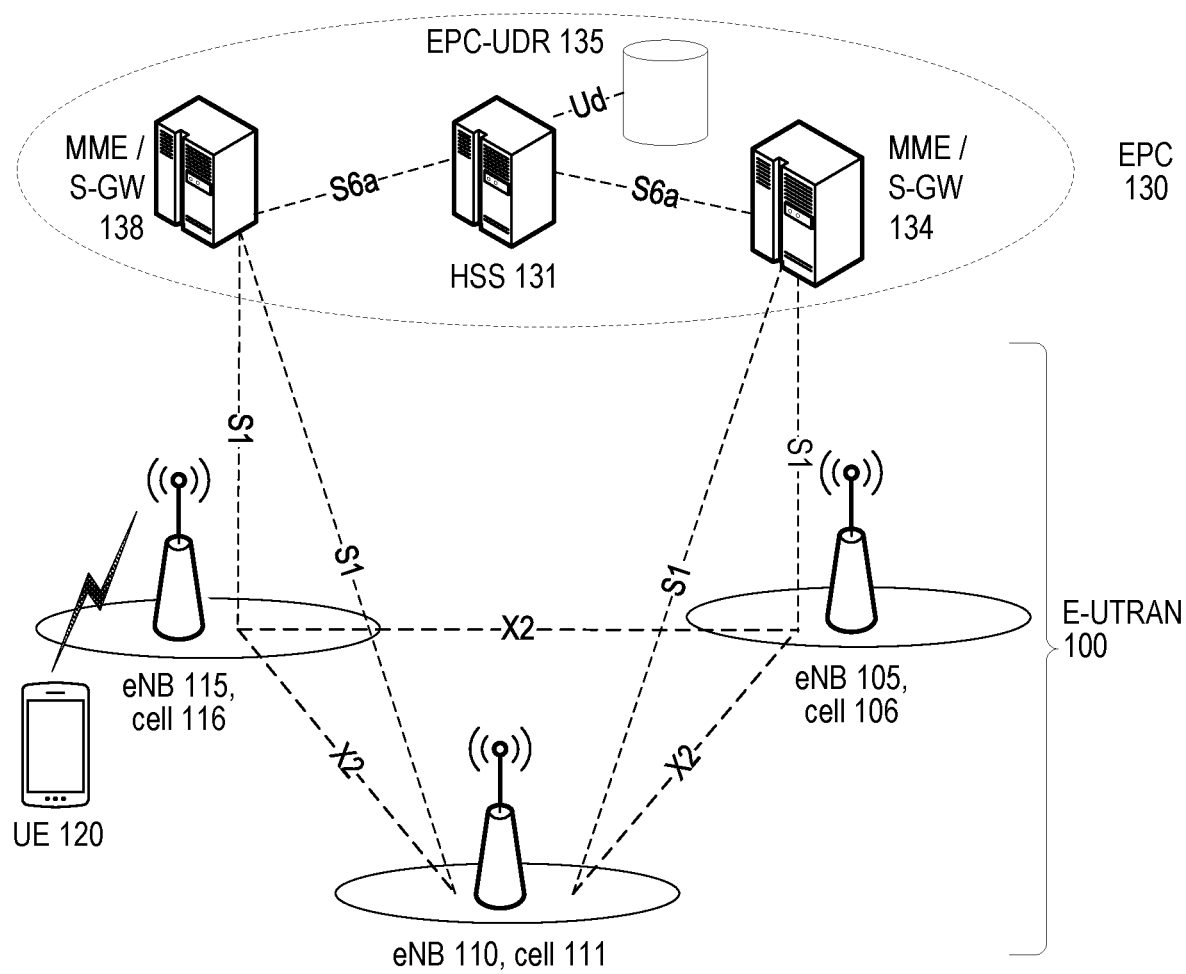
FIG. 1 shows an exemplary LTE network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that is capable, configured, arranged and/or operable to communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with the term "user equipment" (or "UE" for short), with both of these terms having a different meaning than the term "network node".

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 2:
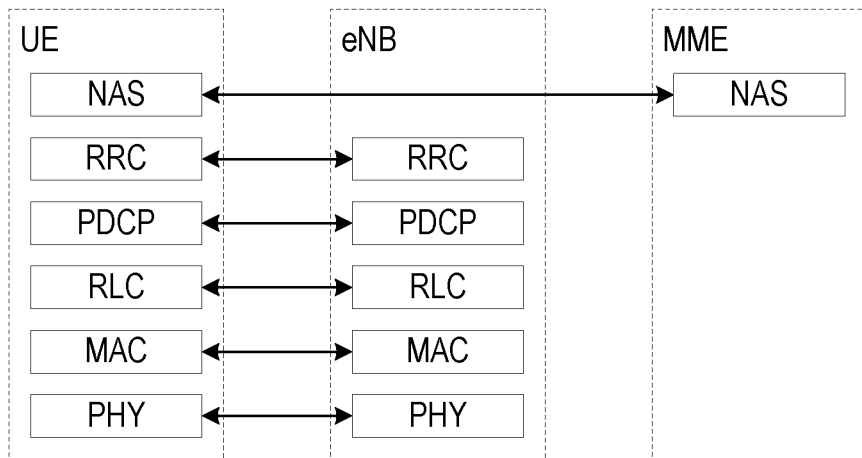
FIG. 2 shows an exemplary LTE control plane (CP) protocol stack.

FIG. 2 illustrates a block diagram of an exemplary control plane (CP) protocol stack between a UE (210), an eNB (220), and an MME (230). The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

In LTE dual connectivity (DC), the MeNB provides system information (SI) and terminates the control plane connection towards the UE and, as such, is the controlling node of the UE, including handovers to and from SeNBs. For example, the MeNB terminates the connection between the eNB and the Mobility Management Entity (MME) for the UE. An SeNB provides additional radio resources (e.g., bearers) for radio resource bearers include MCG bearers, SCG bearers, and split bearers that have resources from both MCG and SCG. The reconfiguration, addition, and removal of SCells can be performed by RRC signaling. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

Both MeNB and SeNB can terminate the user plane (UP) to the UE. The LTE DC UP includes three different types of bearers. MCG bearers are terminated in the MeNB, and the S1-U connection for the corresponding bearer(s) to the S-GW is terminated in the MeNB. SeNB is not involved in the transport of UP data for MCG bearers. Likewise, SCG bearers are terminated in the SeNB, which can be directly connected with the S-GW via S1-U. MeNB is not involved in the transport of UP data for SCG bearers. An S1-U connection between S-GW and SeNB is only present if SCG bearers are configured. Finally, split bearers (and their corresponding S1-U connections to S-GW) are also terminated in the MeNB, but PDCP data is transferred between MeNB and SeNB via X2-U. SeNB and MeNB are involved in transmitting data for split bearers.

Figure 3:
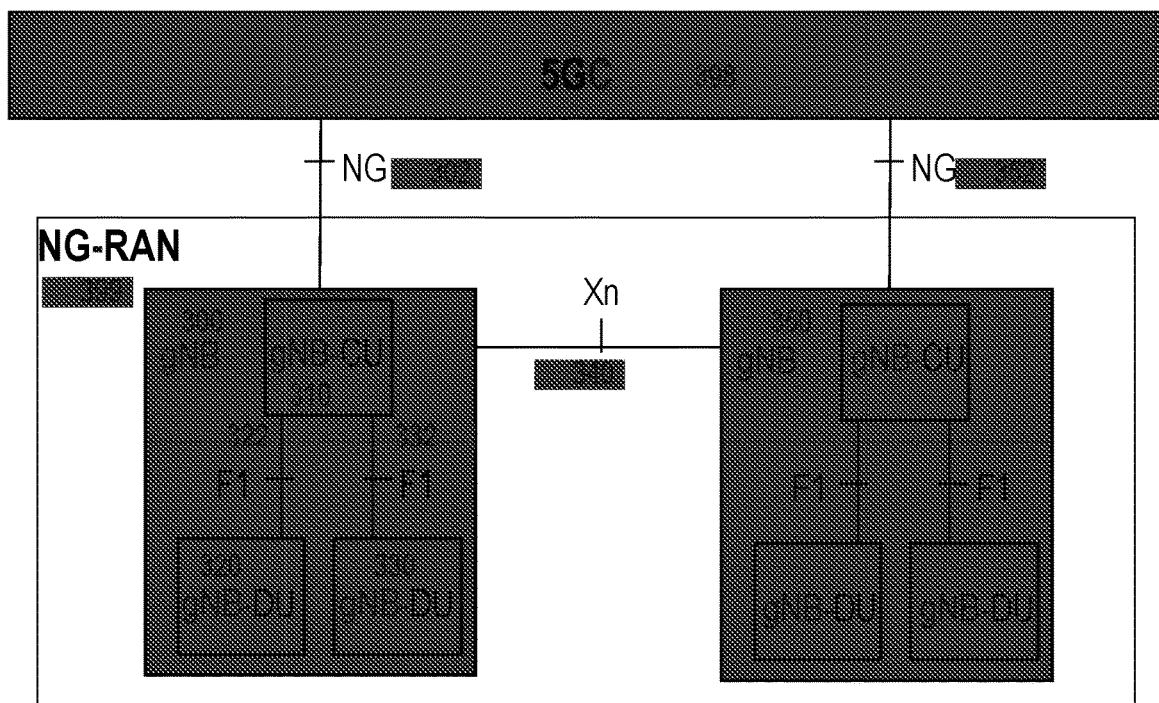
FIG. 3 shows an exemplary 5G/NR network architecture.

FIG. 3 illustrates a high-level view of the 5G network architecture, consisting of a Next Generation RAN (NG-RAN) 399 and a 5G Core (5GC) 398. NG-RAN can include a set of gNodeB's (gNBs) connected to the 3GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. DUs are logical nodes that host lower-layer protocols and can include, depending on the functional split, various subsets of the gNB functions. As such, each CU and DU can include various circuitry needed to perform their respective functions, including processing circuitry, transceiver circuitry (e.g., for communication), and power supply circuitry. A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

3GPP TR 38.804 (v14.0.0) describes various exemplary DC scenarios or configurations in which the MN and SN can apply NR, LTE, or both. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in 3GPP TS 36.300 (v16.3.0), where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

Figure 4:
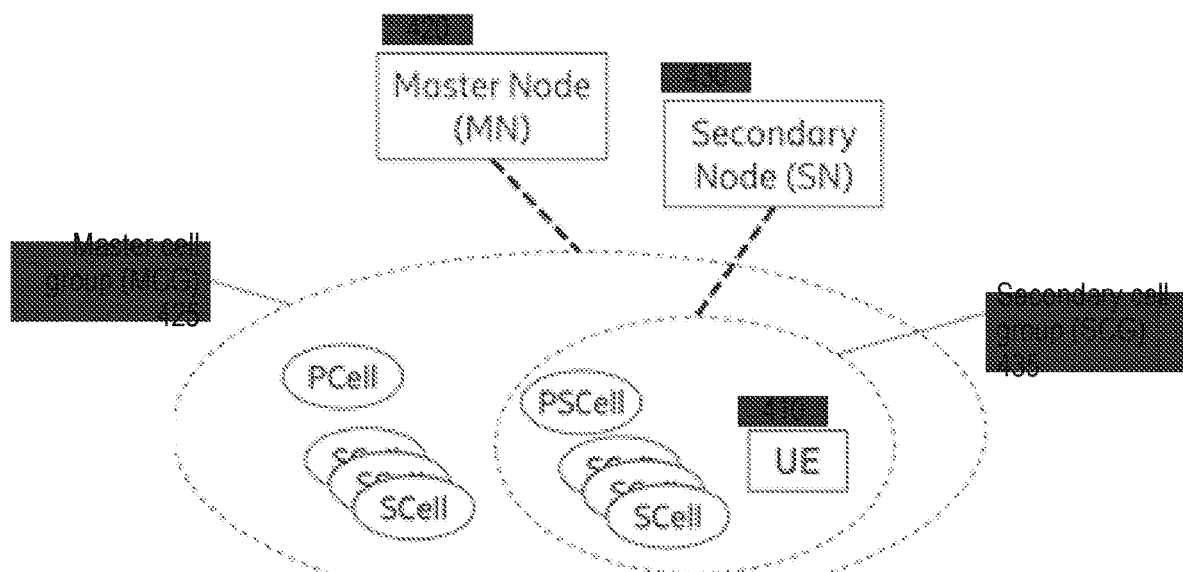
FIG. 4 illustrates dual connectivity (DC) in combination with carrier aggregation (CA).

FIG. 4 shows a high-level illustration of DC combined with CA. In this illustration, each of the MN (420) and the SN (430) for the UE (410) can be an eNB or a gNB, in accordance with the various DC scenarios mentioned above. The MN provides the MCG (425) consisting of a PCell and three SCells arranged in CA, while the SN provides the SCG (435) consisting of a PSCell and three SCells arranged in CA.

Figure 5:
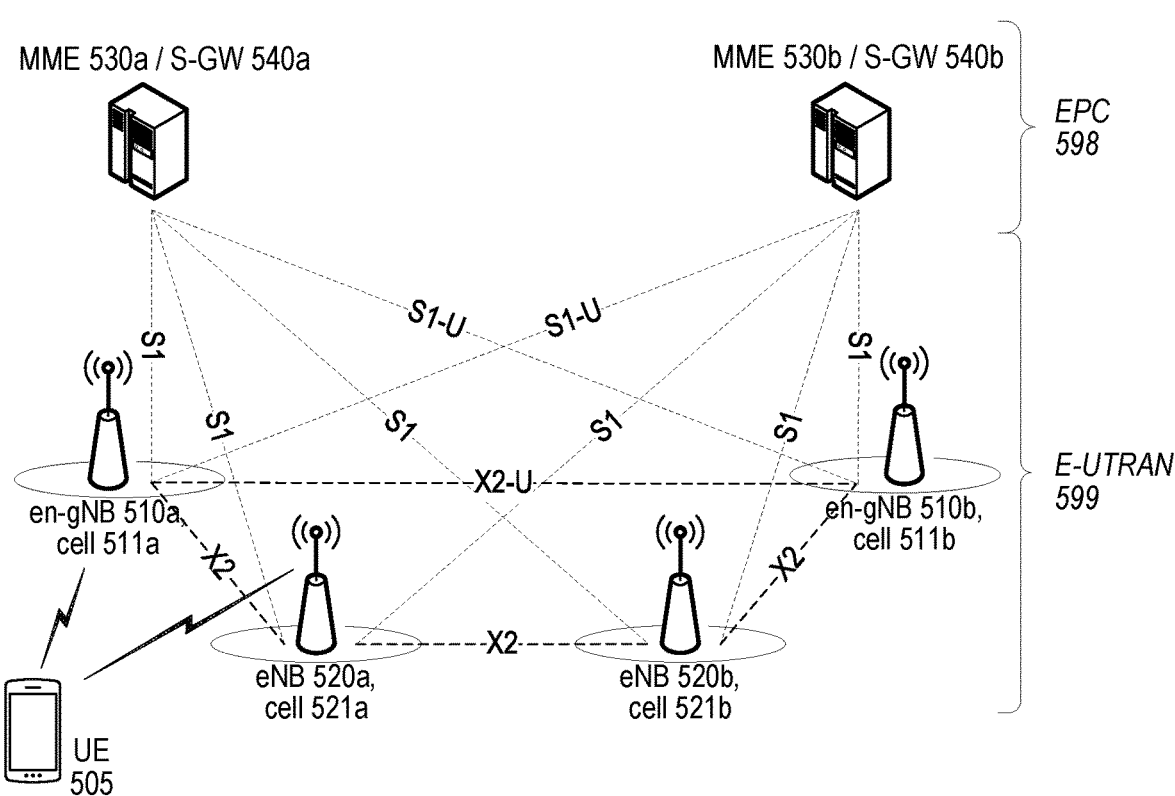
FIGS. 5-6 show exemplary network architectures that support MR-DC using EPC and 5G core network (5GC), respectively.

FIG. 5 shows a high-level view of an exemplary network architecture that supports EN-DC, including an E-UTRAN 599 and an EPC 598. As shown in the figure, E-UTRAN 599 can include en-gNBs (e.g., 510a,b) and eNBs (e.g., 520a,b) that are interconnected with each other via respective X2 (or X2-U) interfaces. The eNBs can be similar to those shown in FIG. 1, while the ng-eNBs can be similar to the gNBs shown in FIG. 3 except that they connect to the EPC via an S1-U interface rather than to a 5GC via an X2 interface. The eNBs also connect to the EPC via an S1 interface, similar to the arrangement shown in FIG. 1. More specifically, the en-gNBs and eNBs connect to MMEs (e.g., 530a,b) and S-GWs (e.g., 540a,b) in the EPC.

Each of the en-gNBs and eNBs can serve a geographic coverage area including one more cells, including cells 511a-b and 521a-b shown as exemplary in FIG. 5. Depending on the cell in which it is located, a UE 505 can communicate with the en-gNB or eNB serving that cell via the NR or LTE radio interface, respectively. In addition, UE 505 can be in EN-DC connectivity with a first cell served by an eNB and a second cell served by an en-gNB, such as cells 520a and 510a shown in FIG. 5.

Figure 6:
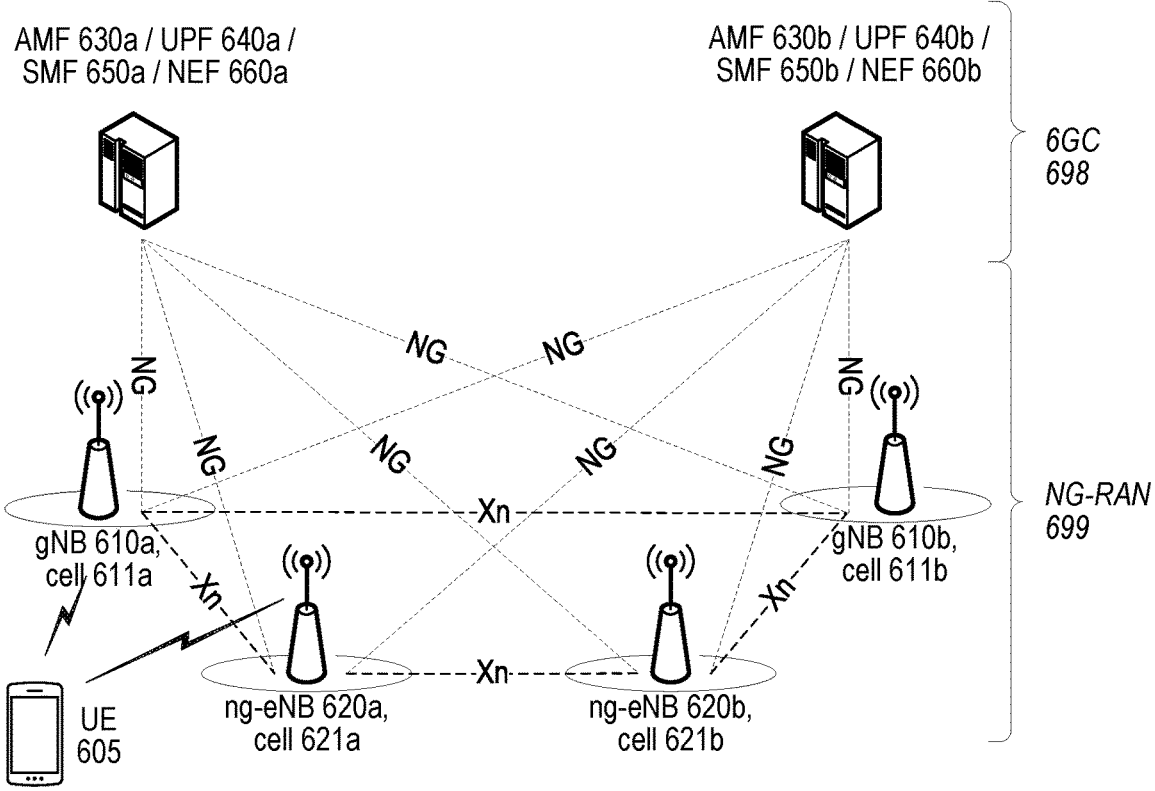

FIG. 6 shows a high-level view of an exemplary network architecture that supports MR-DC configurations based on 5GC. More specifically, FIG. 6 shows an NG-RAN 699 and a 5GC 698. NG-RAN 699 can include gNBs (e.g., 610a,b) and ng-eNBs (e.g., 620a,b) that are interconnected with each other via respective Xn interfaces. The gNBs and ng-eNBs are also connected via the NG interfaces to the 5GC, more specifically to the Access and Mobility Management Functions (AMFs, e.g., 630a,b) via respective NG-C interfaces and to the User Plane Functions (UPFs, e.g., 640a,b) via respective NG-U interfaces. Moreover, the AMFs can communicate with one or more session management functions (SMFs, e.g., 650a,b) and network exposure functions (NEFs, e.g., 660a,b).

Each of the gNBs can be similar to those shown in FIG. 5, while each of the ng-eNBs can be similar to the eNBs shown in FIG. 1 except that they connect to the 5GC via an NG interface rather than to EPC via an S1 interface. Each of the gNBs and ng-eNBs can serve a geographic coverage area including one more cells, including cells 611a-b and 621a-b shown as exemplary in FIG. 6. The gNBs and ng-eNBs can also use various directional beams to provide coverage in the respective cells. Depending on the cell in which it is located, a UE 605 can communicate with the gNB or ng-eNB serving that cell via the NR or LTE radio interface, respectively. In addition, the UE can be in MR-DC connectivity with a first cell served by an ng-eNB and a second cell served by a gNB, such as cells 620a and 610a shown in FIG. 6.

Figure 7:
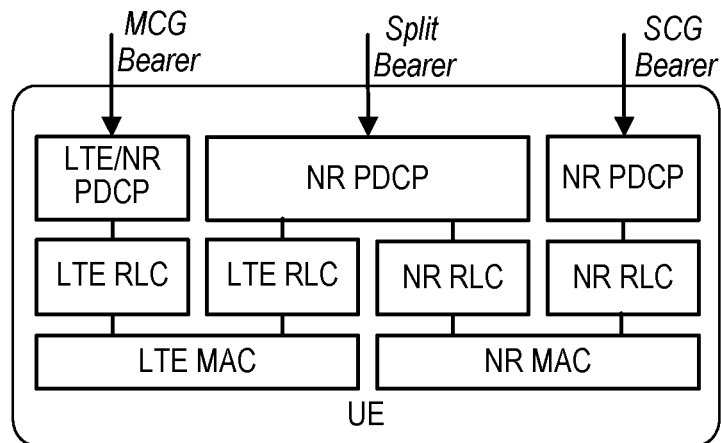
FIGS. 7-8 show user plane (UP) radio protocol architectures from a UE perspective for EN-DC with EPC and MR-DC with 5GC, respectively.
Figure 8:
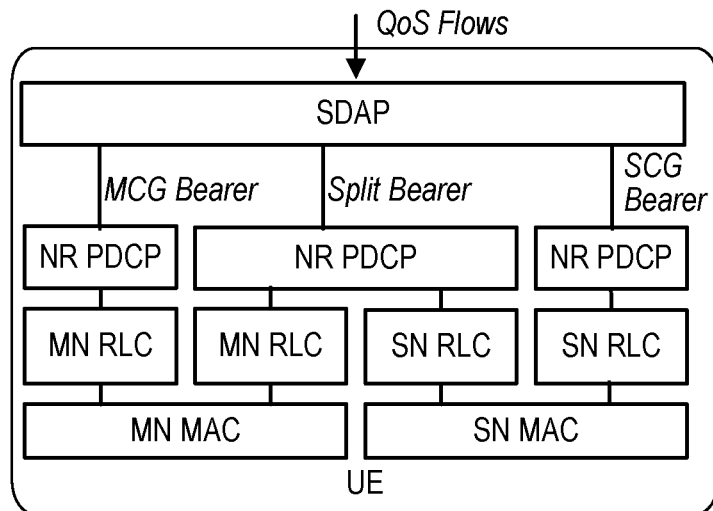

FIGS. 7-8 show UP radio protocol architectures from a UE perspective for MR-DC with EPC (e.g., EN-DC) and with 5GC (e.g., NGEN-DC, NE-DC, and NR-DC), respectively. In both cases, a UE supports MCG, SCG, and split bearers, as discussed above. In the EN-DC arrangement shown in FIG. 7, MCG bearers have either LTE (e.g., E-UTRA) or NR PDCP and LTE RLC and MAC layers, while SCG bearers have NR PDCP, RLC, and MAC layers. Split bearers have NR PDCP layer and both LTE and NR RLC and MAC layers. In the arrangement shown in FIG. 8, all bearers have NR PDCP layers and lower layers corresponding to the RAT used by the MN and SN. One difference between the architectures in FIGS. 7-8 is that the various bearers for MR-DC with 5GC are associated with QoS flows that are terminated in an SDAP layer above PDCP.

Figure 9:
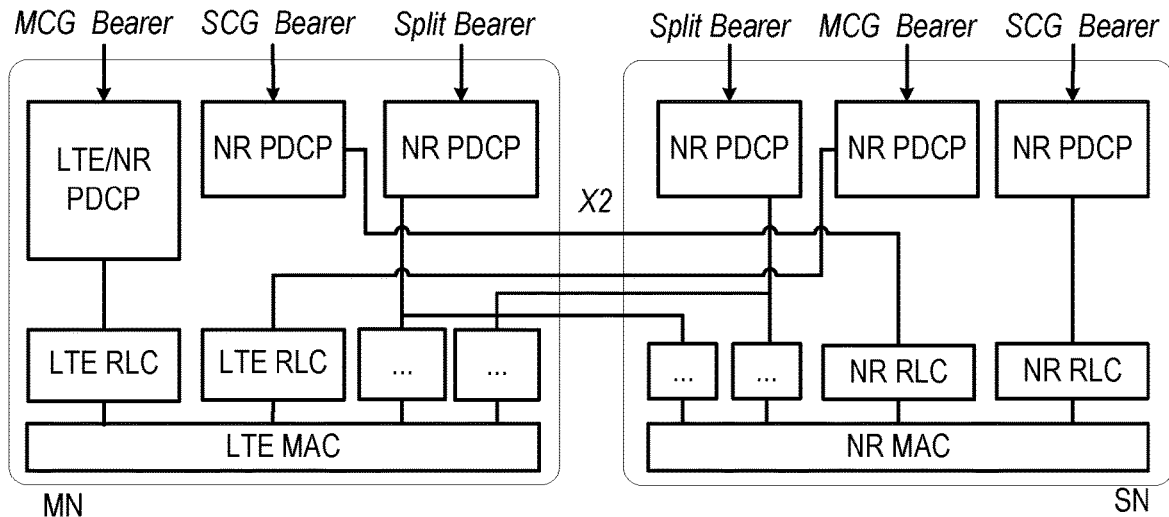
FIGS. 9-10 show UP radio protocol architectures from a network perspective for EN-DC with EPC and MR-DC with 5GC, respectively.
Figure 10:
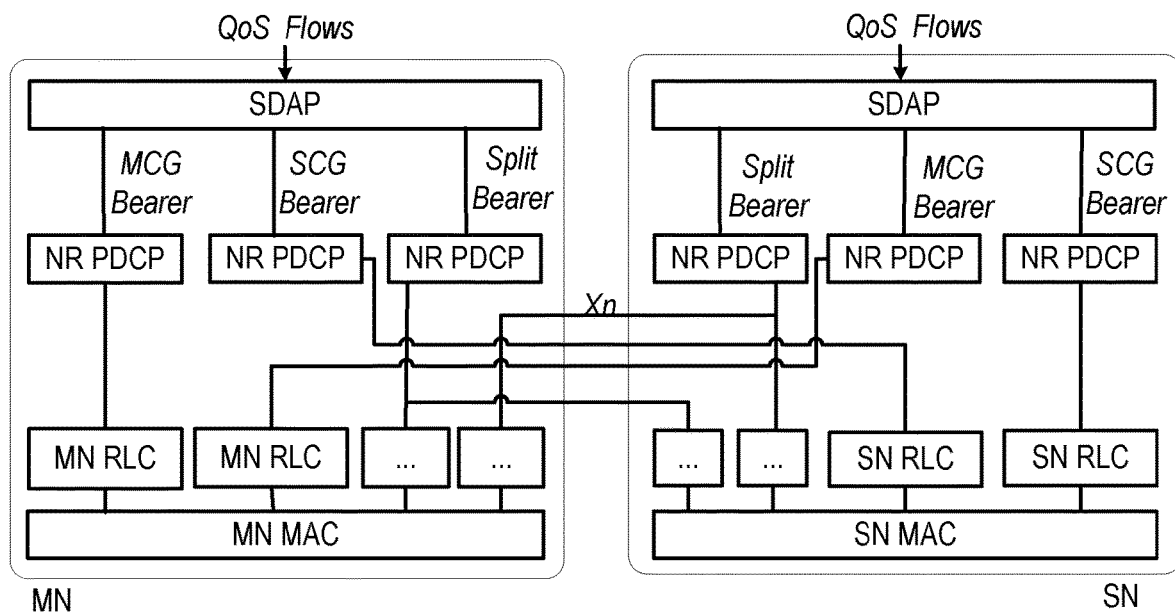

FIGS. 9-10 show UP radio protocol architectures from a network perspective for MR-DC with EPC (e.g., EN-DC) and with 5GC (e.g., NGEN-DC, NE-DC, and NR-DC), respectively. In the EN-DC arrangement shown in FIG. 9, an MCG bearer terminated in MN has PDCP layer of the RAT used by the MN, while all other bearers have NR PDCP layer. All bearers have lower layers associated with the RAT of the node(s) in which they are terminated. In the arrangement shown in FIG. 10, all bearers have NR PDCP layers and lower layers associated with the RAT of the node(s) in which they are terminated. From a network perspective, each MCG, SCG, or and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN. One difference between the architectures in FIGS. 9-10 is that the various bearers for MR-DC with 5GC are associated with QoS flows that are terminated in the SDAP layer above PDCP.

FIGS. 9-10 also have some DC-specific variations. In EN-DC with EPC, the network can configure either E-UTRA PDCP or NR PDCP for MN terminated MCG data radio bearers (DRBs) while NR PDCP is always used for all other DRBs. In MR-DC with 5GC, NR PDCP is always used for all DRB types. In NGEN-DC, E-UTRA RLC/MAC is used in the MN while NR RLC/MAC is used in the SN. In NE-DC, NR RLC/MAC is used in the MN while E-UTRA RLC/MAC is used in the SN. In NR-DC, NR RLC/MAC is used in both MN and SN.

FIG. 11 is a block diagram showing a high-level comparison of CP architectures in LTE DC, EN-DC, and MR-DC using 5GC. One primary difference is that the SN has a separate NR RRC entity in EN-DC and NR-DC. This means that the SN can also control the UE, sometimes without the knowledge of the MN but often in coordination with the MN. In LTE DC, the RRC decisions are always made by the MN (MN to UE). Even so, the LTE DC SN still decides its own configuration because it is aware of its resources, capabilities etc. while the MN is not.

Another difference between LTE DC and the others is the use of a split bearer for RRC. Split RRC messages are mainly used for creating diversity, and the sender can choose one of the links for scheduling the RRC messages, or it can duplicate the message over both links. In the DL, the path switching between the MCG or SCG legs (or duplication on both) is left to network implementation. On the other hand, for the UL, the network configures the UE to use the MCG, SCG, or both for RRC messages. The terms "leg", "path" and "RLC bearer" are used interchangeably throughout this document.

Packet duplication (also referred to as "PDCP duplication" or "PDCP PDU duplication") can increase reliability and reduce latency, which can be very beneficial for ultra-reliable low latency (URLLC) data services. When PDCP duplication is configured for a radio bearer by RRC, an additional RLC entity and an additional logical channel are added to the radio bearer to handle the duplicated PDCP protocol data units (PDUs). As such, PDCP duplication involves sending the same PDCP PDUs twice: once on the original (or primary) RLC entity and a second time on the additional (or secondary) RLC entity.

FIG. 12 illustrates an exemplary PDCP duplication scheme. Note that the primary RLC entity is associated with a primary logical channel (LCH) and the secondary RLC entity is associated with a secondary LCH. When configuring duplication for a DRB, RRC also sets the state of PDCP duplication (i.e., activated or deactivated) at the time of (re-)configuration. After the configuration, the PDCP duplication state can then be dynamically controlled by a MAC CE. In DC, the UE applies these MAC CE commands regardless of whether they were received via MCG or SCG.

3GPP previously specified concepts of dormant LTE SCell and dormancy-like behavior of an NR SCell. In LTE, when an SCell is in dormant state, the UE does not need to monitor the corresponding physical downlink control channel (PDCCH) or physical downlink shared channel (PDSCH) and cannot transmit in the corresponding UL. This behavior is similar to behavior in a deactivated state, but the UE is also required to perform and report CQI measurements, which is different from deactivated state behavior. A physical UL control channel (PUCCH) SCell (i.e., SCell configured with PUCCH) cannot be in dormant state.

FIG. 13 shows an exemplary state transition diagram for NR SCells. At a high level, a UE's SCell can transition between deactivated and activated states based on explicit commands from the network (e.g., MAC CEs) or expiration of a deactivation timer.

Dormancy-like behavior for NR SCells is based on the concept of dormant bandwidth parts (BWP). One of the UE's dedicated BWPs configured via RRC signaling can be configured as dormant for an SCell. If the active BWP of the activated SCell is a dormant BWP, the UE stops monitoring PDCCH on the SCell but continues performing CSI measurements, AGC, and beam management (if configured to do so).

The term "Special Cell" (or "SpCell" for short) refers to the PCell of the MCG or the PSCell of the SCG depending on whether the UE's MAC entity is associated with the MCG or the SCG, respectively. An SpCell is always activated and supports PUCCH transmission and contention-based random access by UEs. Downlink control information (DCI) on PDCCH is used to control entering/leaving the dormant BWP for SCell(s) or SCG(s), and is sent to the SpCell of the cell group that includes the dormant SCell (i.e., to PCell if SCell belongs to MCG, 25 to PSCell if SCell belongs to SCG). The SpCell (i.e., PCell or PSCell) and PUCCH SCell cannot be configured with a dormant BWP.

However, if the UE is configured with MR-DC, it cannot fully benefit from the energy reductions of dormant state or dormancy-like behavior since the PSCell cannot be configured to be dormant. Instead, an existing solution could be releasing (for power savings) and adding (when traffic demands requires) the SCG on an as-needed basis. Traffic is likely to be bursty, however, so adding and releasing the SCG as needed can involve a significant amount of RRC signaling and inter-node messaging between the MN and the SN. This can experience considerable delay.

In the context of 3GPP Rel-16, there were some discussions about placing the PSCell in dormancy, also referred to as SCG Suspension. Some agreed principles of this solution include:

The UE supports network-controlled suspension of the SCG in RRC_CONNECTED.
UE behavior for a suspended SCG is for further study (FFS)
The UE supports at most one SCG configuration, suspended or not suspended, in Rel16.
In RRC_CONNECTED upon addition of the SCG, the SCG can be either suspended or not suspended by configuration.

More detailed solutions were proposed for Rel-16, but these have various problems. For example, one solution proposed that a gNB can indicate for a UE to suspend SCG transmissions when no data traffic is expected to be sent in SCG, so that UE keeps the SCG configuration but does not use it for power saving purposes. Signaling to suspend SCG could be based on DCI/MAC-CE/RRC, but no details were discussed above the particular configuration from the gNB to the UE. Even so, this solution for SCells may not be applicable to PSCells, which may be associated with a different network node (e.g., a gNB operating as SN).

Discussions are ongoing in 3GPP RAN1, RAN2, and RAN3 WGs about solutions for the Rel-17 MR-DC work item objective "Support efficient activation/de-activation mechanism for one SCG and SCells". One concept being discussed is a "deactivated SCG" with reduced energy consumption when traffic demands are dynamically reduced. This can be especially important for MR-DC configurations with NR SCG since, in some cases, NR UE energy consumption is three-to-four times higher than in LTE.

FIG. 14 is an exemplary state transition diagram illustrating two SCG states (sometimes referred to as "states for SCG activation") according to this concept. In FIG. 14, these states are labelled "SCG deactivated state" and "SCG activated state" and are distinct from RRC states. Rather, these SCG states indicate whether the UE has applied an SCG energy saving mode.

3GPP RAN2 has agreed that SCG activation state can be configured via RRC. In addition, the following properties apply to a deactivated SCG:

No PDCCH/PDSCH/PUSCH Tx/Rx on PSCell;
All SCells are deactivated;
SCG reconfiguration via MCG is supported;
Radio resource management (RRM) and PSCell mobility is supported;
Both RACH and RACH-less SCG activation is supported;
UE keeps Time Alignment timer running;
UE continues BFD and radio link monitoring (RLM), if configured; and
SCG activation indication can indicate TCI state.

NR Rel-15 introduced BFD and BFR. The network configures a UE with BFD reference signals (e.g., SSB or CSI-RS) to be monitored, and the UE declares beam failure when a quantity of beam failure indications from PHY reaches a configured threshold before a configured timer expires. SSB-based BFD can only be configured for the UE's initial DL BWP and for DL BWPs containing the SSB associated with the initial DL BWP. For other DL BWPs, BFD must be performed based on CSI-RS.

Resources and parameters for UE BFD are configured via RRC as part of the ServingCellConfig IE within each dedicated DL BWP configuration (i.e., BWP-DownlinkDedicated field) within the RadioLinkMonitoringConfig IE. FIG. 15 shows an ASN.1 data structure for an exemplary RadioLinkMonitoringConfig IE. This exemplary IE includes field failure DetectionResourcesToAddModList, which is a sequence of RadioLinkMonitoringRS fields that define the specific RS resources (e.g., CSI-RS or SSB) for BFD. More details about this exemplary RadioLinkMonitoringConfig IE are in 3GPP TS 38.331 (v16.6.0).

After BFD, the UE initiates a RA procedure on the PCell and selects a suitable beam to perform BFR. If the serving gNB has provided dedicated RA resources for certain beams, those will be prioritized by the UE. Upon completion of the RA procedure, BFR is considered complete. More details about UE actions during BFD and BFR are in 3GPP TS 38.321 (v16.6.0).

Resources and parameters for UE BFR are configured via RRC as part of the CellGroupConfig IE within each dedicated UL BWP configuration (i.e., BWP-UplinkDedicated field) within the BeamFailureRecoveryConfig IE. These configured resources and parameters include a candidate beam list to be selected upon BFR, threshold(s) for beam selection, etc. FIG. 16 shows an ASN.1 data structure for an exemplary BeamFailureRecoveryConfig IE. More details about this exemplary RadioLinkMonitoringConfig IE are in 3GPP TS 38.331 (v16.6.0).

As mentioned above, it has been agreed that the UE performs BFD in a deactivated SCG only when the network configures it to do so. However, when the UE detects a beam failure for the PSCell of a deactivated SCG, it is unclear what action should be taken by the UE. For example, one possible solution is for the UE to perform BFR in the same way as when the SCG is activated, which causes the UE to perform RA to the PSCell. One drawback with this approach is increased UE energy consumption due to the RA.

Another possible solution is that the UE reports the deactivated SCG beam failure to the network via MCG. Triggered by the UE beam failure report, the network may reconfigure the UE with new resources for BFD and other beam-related information (e.g., TCI states) to enable to the UE to find good beams and resume BFD in the SCG. A drawback with this solution is that even if the UE reports SCG beam failure in the MCG, both the success of the reconfiguration and whether the network will actually perform it are uncertain (i.e., dependent on network implementation). Meanwhile, the UE may still trigger new beam failures and send new reports to the network. This results in excess network signaling as well as increased UE energy consumption, both of which are undesirable.

Accordingly, embodiments of the present disclosure provide novel, flexible, and efficient techniques for a UE operating in MR-DC with a first cell group (e.g., MCG)

provided by a first RAN node and a second cell group (e.g., SCG) provided by a second RAN node, to perform BFD for a cell (e.g., PSCell) in the second cell group while the second cell group is deactivated and to perform further actions upon detecting beam failure in the second cell group.

In various embodiments, at a high level, the UE receives from a RAN node a message with an indication that the second cell group is deactivated and performs BFD for a cell in the second cell group according to a BFD configuration. In some embodiments, when the UE has detected beam failure, it sends a message to a RAN node indicating detected beam failure only when a timer is not running and then starts the timer. In another embodiment, when the UE has detected beam failure, it stops BFD then sends the message and starts the timer.

In various embodiments, at a high level, a first network node controls BFD performed by a UE operating in MR-DC with a first cell group (e.g., MCG) controlled by the first RAN node and a second cell group (e.g., SCG) controlled by a second RAN node, while the second cell group is deactivated. In these embodiment, the network node receives a message from the UE indicating that a beam failure has occurred and provides a BFD configuration to the UE.

Embodiments provide various benefits and/or advantages. For example, since a beam failure condition often occurs for an extended duration, the UE may detect this as multiple beam failure events over the duration. Embodiments enable the UE to report the beam failure condition to the network only once for the duration, or until the network provides a new beam failure detection configuration to the UE. This can reduce the amount of signaling due to beam failures, reduce network load, and reduce UE energy consumption.

In the following discussion, the terms "suspended SCG", "deactivated SCG", "inactive SCG", and "SCG in reduced-energy mode" are used interchangeably. From the UE perspective, however, "SCG in reduced-energy mode" means that the UE is operating in a reduced-energy mode with respect to the SCG. Likewise, the terms "resumed SCG", "activated SCG", "active SCG", "SCG in normal energy mode", "normal SCG operation", and "legacy SCG operation" are used interchangeably. From the UE perspective, "SCG in normal energy mode" means that the UE is operating in a normal (i.e., non-reduced) energy mode with respect to the SCG. Examples of operations are UE signal reception/transmission procedures, RRM measurements, reception of signals, transmission of signals, measurement configuration, measurement reporting, evaluation of triggered event measurement reports, etc.

In the following, various embodiments are described in terms of an SCG that is deactivated for a UE configured with DC, with the MCG operating in a normal (or activated) mode. In such case, the UE will stop monitoring PDCCH on the deactivated SCG cells (i.e., PSCell and/or SCG SCells) but continues monitoring PDDCH on the MCG. However, similar principles can be applied to an MCG that is deactivated for a UE configured with DC, with the SCG operating in a normal (or activated) mode. In such case, the UE will stop monitoring PDCCH on the deactivated MCG cells (i.e., PCell and/or MCG SCells) but continues monitoring PDDCH on the SCG.

The various embodiments described below are equally applicable to UEs in EN-DC with an LTE MCG and an NR SCG, MR-DC with an NR MCG and an LTE SCG, and NR-DC with NR MCG and SCG. Even if certain message names in the following description may be associated with a particular RAT (e.g., LTE or NR) in 3GPP specifications, such names are used generically below unless specifically noted.

Figure 17:
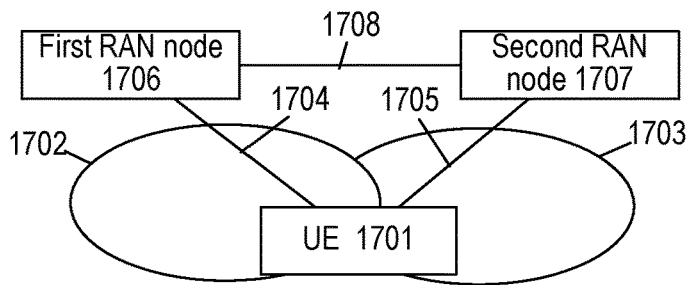
FIG. 17 shows a diagram of an exemplary communication system that includes a UE and first and second RAN nodes, according to various embodiments of the present disclosure.

FIG. 17 shows a diagram of an exemplary communication system, which provides a context for the following description of various embodiments. A UE 1701 is configured for DC (e.g., MR-DC) and is connected to via a first cell group 1702 to a first RAN node 1706 over a first radio interface 1704. The UE is also connected via a second cell group 1703 to a second RAN node 1707 over a second radio interface 1705.

The first RAN node (e.g., MN) provides and/or controls the first cell group (e.g., MCG) \, which includes a main cell (e.g., PCell) and optionally one or more further cells (e.g., SCells) in a CA configuration. The second RAN node (e.g., SN) provides and/or controls the second cell group (e.g., SCG), which includes a main cell (e.g., PSCell) and optionally one or more further cells (e.g., SCells) in a CA configuration. The first RAN node is connected to the second RAN node over an interface 1708 (e.g., X2 or Xn). Note that the first cell group and second cell group are specific to the UE, while other UEs served by the two RAN nodes may have UE-specific cell groups composed of the same or different cells provided and/or controlled by the two RAN nodes.

In various embodiments, a UE configured for DC with an MCG and an SCG receives, from a first RAN node configured to provide the MCG, a message with an indication that the SCG is deactivated. The UE then performs BFD for a cell (e.g., PSCell) in the SCG. In some embodiments, the beam failure detection is performed according to a BFD configuration that is included in a message received from a RAN node, such as the first RAN node. In different variants, the BFD configuration includes one or more of the following:

an indication of whether the UE should perform BFD on the cell in the SCG while the SCG is deactivated;
an indication of whether the UE should send a message in the MCG upon detected beam failure for the cell in the SCG;
a value used to initiate a timer when the UE sends a message in the MCG upon detected beam failure for the cell in the SCG;
an indication for the UE to start or stop BFD for the cell in the SCG; and
an indication of which measurement results the UE should include in a message indicating detected beam failure on the cell in the SCG.

The UE can also perform an action upon detecting beam failure for the cell in the SCG. In some embodiments, upon detection of beam failure for the cell in the SCG, the UE stops the BFD on the cell in the SCG and transmits to the first RAN node a message indicating detected beam failures on the cell in the SCG.

In some variants, after transmitting the message indicating detected beam failures on the cell in the SCG, the UE starts a timer, e.g., in RRC or MAC layer. This timer may be associated with the SCG or with the cell for which beam failure was detected. Upon expiration of the timer, the UE re-transmits the same message and restarts the timer.

In some further variants, the UE transmits the message only if beam failure was again detected after timer expiration. The UE stops the timer if/when the network provides a BFD configuration on the cell in the SCG after the timer has been started. In these variants, timer expiration and timer stopped are two different states of the timer, and so that the UE re-transmits the message when the timer expires but does not re-transmit the message when the timer is stopped. The timer value can be RRC-configurable. In one example, the timer value can be infinity, which causes the timer not to expire and prevents the UE from re-transmitting the message.

In other variants, after transmitting the message indicating beam failure detected on the cell in the SCG and starting a timer, the UE increments a counter. Upon the expiry of the timer, the UE re-transmits the same message, restarts the timer, and increments the counter. If the value of counter becomes higher than a configurable threshold (e.g., count), the UE does not re-transmit the same message. In some further variants, the value of the counter is reset to zero when the UE receives an indication or a BFD configuration from the first RAN node.

In some embodiments, the message to indicate detected beam failure on the cell in the SCG is an SCGFailureInformation message. For example, this message can include a failure type that indicates beam failure for deactivated SCG.

In other embodiments, upon detection of a beam failure on the cell in the SCG, the UE continues the BFD on the cell in the SCG, and transmits to the first network node a message indicating detected beam failures on the cell in the SCG, unless a timer is running. In other words, the UE does not transmit the message indicating detected beam failures on the cell in the SCG when the timer is running. The UE starts the timer under the following conditions:

upon the first detection a beam failure on the cell in the SCG; or upon subsequent detections of a beam failure on the cell in the SCG, when the timer is neither running nor expired.

In these embodiments, if the UE is indicated (e.g., in the received BFD configuration) to transmit a message indicating detected beam failure on the cell in the SCG and to start the timer according to the above conditions, the UE first transmits the message indicating the detected beam failure and then starts the timer.

In these embodiments, the UE stops the running timer when the network provides a BFD configuration in a message on the cell in the SCG while the timer is running (after it has been started). The value used to initiate the timer can either be fixed or network configurable. When the timer expires, the UE will again transmit a message when beam failure is detected. In one example, the timer value can be infinity, which causes the timer not to expire and prevents the UE from re-transmitting the message.

In a variant of these embodiments, upon detection of a beam failure on the cell in the SCG, the UE stops BFD on the cell while the timer is running. Upon the timer expiring or being stopped by the UE, the UE resumes BFD on the cell.

In some embodiments, the message to indicate detected beam failure on the cell in the SCG is an SCGFailureInformation message. For example, this message can include a failure type that indicates beam failure for deactivated SCG.

In other embodiments, the message transmitted to a network node to indicate beam failure detected on the cell in the SCG can includes measurement results, e.g., for one or more beams. The measurement results can be provided with corresponding beam identifiers, such as an SSB index. For example, when the message is an RRC message, the UE includes a MAC control element (CE) in the RRC message (e.g., as an OCTET STRING in ASN.1). As a more specific example, the MAC CE can be a BFR or Truncated BFR.

In other embodiments, the network configures which measurement results the UE should include in the message indicated detected beam failure on the cell in the SCG. This may be part of the BFD configuration received from the network. For example, the network may configure that the UE should include measurement results for each beam when beam failure was detected or whether to include a MAC CE in the message.

Figure 18:
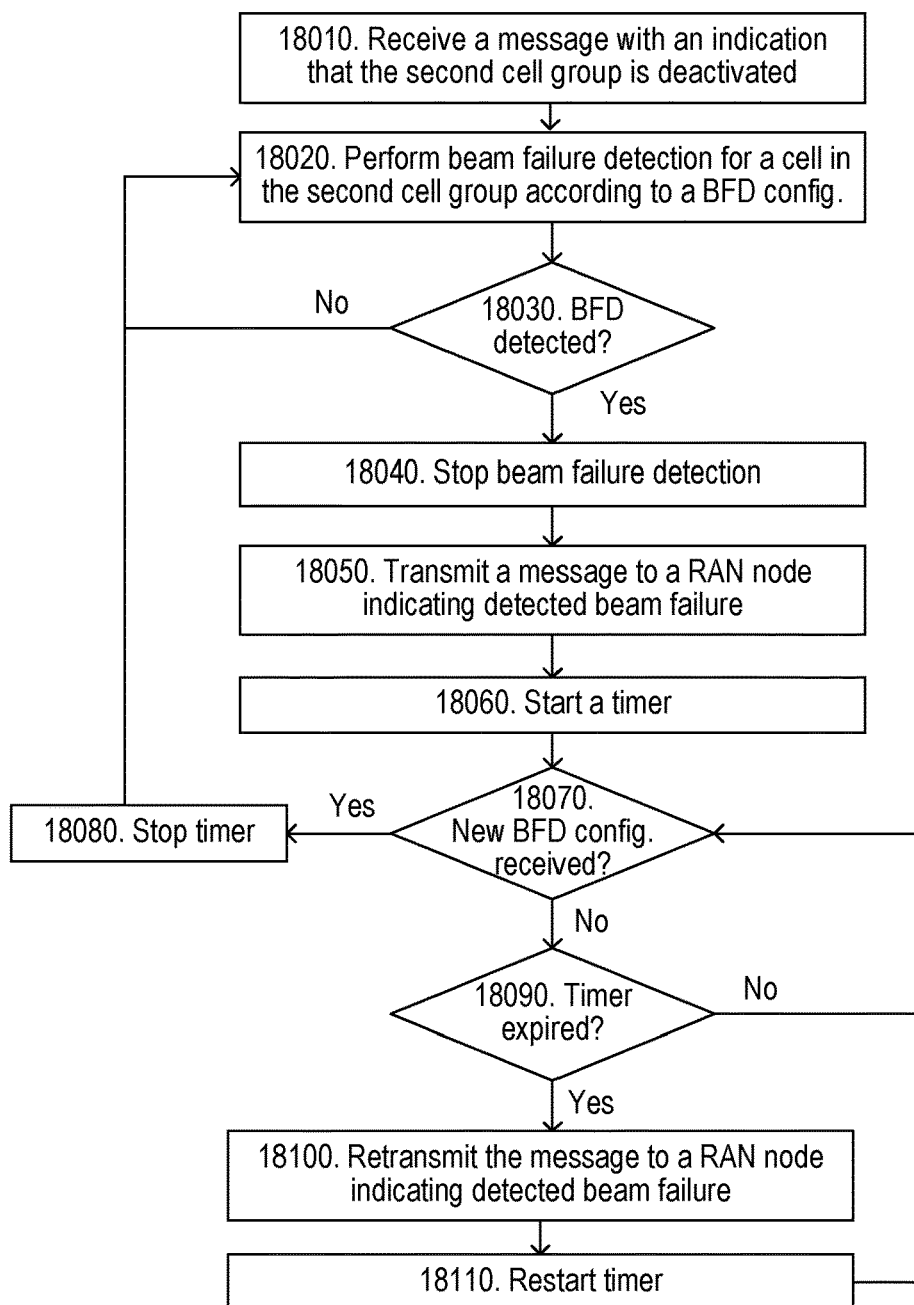
FIGS. 18-19 show flow diagrams of exemplary procedures performed by a UE, according to various embodiments of the present disclosure.

FIG. 18 shows a flow diagram of an exemplary procedure performed by a UE, according to some embodiments of the present disclosure. Although the operations are given numerical labels, this is done to facilitate explanation rather than to require or imply a particular operational order, unless expressly stated otherwise.

In operation 18010, the UE receives from the first network node a message indicating that the second cell group is deactivated. In operations 18020-18030, the UE performs BFD for a cell in the SCG according to a BFD configuration. If beam failure was detected, the UE goes to operation 18040, where the UE stops BFD for the cell.

In operation 18050, the UE then transmits a message (e.g., SCGFailureInformation) to the first network node, the message indicating the detected beam failure. In some variants, the message may also include beam measurement results. In operation 18060, the UE starts a timer. In operations 18070-18080, if a new BFD configuration was received the UE stops the timer and goes back to operation 18020. If a new BFD configuration is not received before the timer expires, the UE retransmits the message indicating detected beam failure restarts the timer (operations 18090-18110). Otherwise, the UE loops between 18070 and 18090 while the timer is running/not expired.

Figure 19:
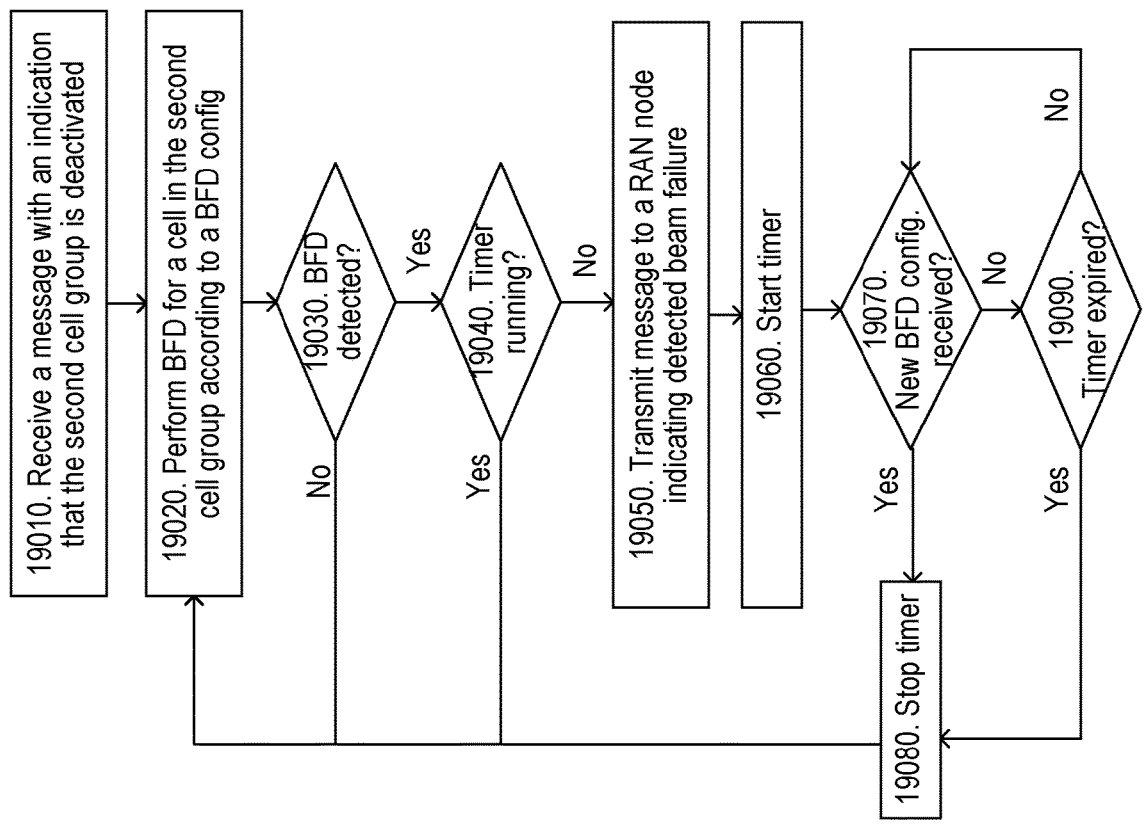

FIG. 19 shows a flow diagrams of an exemplary procedure performed by a UE, according to other embodiments of the present disclosure. Although the operations are given numerical labels, this is done to facilitate explanation rather than to require or imply a particular operational order, unless expressly stated to the contrary.

In operation 19010, the UE receives from the first network node a message indicating that the second cell group is deactivated. In operations 19020-19030, the UE performs BFD for a cell in the SCG according to a BFD configuration. If beam failure was detected, the UE goes to operation 19040, where the UE checks if a timer is running. If the timer is running, the UE returns to operation 19020; otherwise in operation 19050 the UE transmits a message (e.g., RRC SCGFailureInformation) to the first network node, the message indicating the detected beam failure. In some variants, the message may also include beam measurement results.

In operation 19060, the UE starts the timer. In operations 19070-19080, the UE stops the timer and goes back to operation 19020 if the timer expires or if a new BFD configuration is received while the timer is running/not expired.

In other embodiments, a first RAN node arranged to provide an MCG for a UE can be further arranged to control BFD by the UE in the UE's deactivated SCG. The first RAN node can transmit, to the UE, a message indicating that the SCG is deactivated, and then receive, from the UE, a message indicating detected beam failure for a cell in the SCG. In some embodiments, the received message can include measurement results, e.g., for one or more beams. The measurement results can be provided with corresponding beam identifiers, such as an SSB index. For example, when the message is an RRC message, the UE includes a MAC CE in the RRC message (e.g., as an OCTET STRING in ASN.1). As a more specific example, the MAC CE can be a BFR or Truncated BFR.

The first RAN node can then transmit, to the UE, a message including a BFD configuration. In different variants, the BFD configuration can include one or more of the following:
- an indication of whether the UE should perform BFD on the cell in the SCG while the SCG is deactivated;
- an indication of whether the UE should send a message in the MCG upon detected beam failure for the cell in the SCG;
- a value used to initiate a timer when the UE sends a message in the MCG upon detected beam failure for the cell in the SCG;
- an indication for the UE to start or stop BFD for the cell in the SCG; and
- an indication of which measurement results the UE should include in a message indicating detected beam failure on the cell in the SCG.

Figure 20:
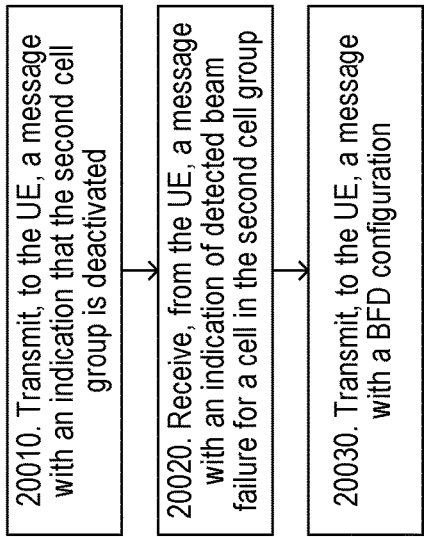
FIG. 20 shows a flow diagram of an exemplary procedure performed by a RAN node, according to various embodiments of the present disclosure.

FIG. 20 shows a flow diagram of an exemplary procedure performed by a RAN node, according to various embodiments of the present disclosure. Although the operations are given numerical labels, this is done to facilitate explanation rather than to require or imply a particular operational order, unless expressly stated to the contrary.

In operation 20010, the RAN node transmits, to the UE, a message indicating that the SCG is deactivated. In operation 20020, the RAN node receives, from the UE, a message indicating detected beam failure for a cell in the SCG. The message may also include beam measurement results. In operation 20030, the RAN node transmits, to the UE, a message with a BFD configuration and possibly a beam configuration, such as an updated beam configuration based on the measurement results received in operation 20020.

Figure 21:
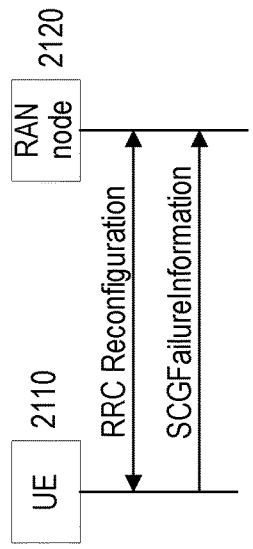
FIG. 21 shows a signaling diagram between a UE and a RAN node, according to various embodiments of the present disclosure.

Various embodiments can be specified in a 3GPP document. Exemplary specification text for 3GPP TS 38.331 is given below, with less relevant portions of the text being omitted for brevity (indicated by ellipses). In this example, when UE MAC layer indicates beam failure for a PSCell when SCG is deactivated, if timer T399 is not running, the UE RRC layer transmits a SCGFailureInformation message in the MCG and starts a timer T399. Upon expiry of timer T399, the SCGFailureInformation message is retransmitted. FIG. 21 shows a signaling diagram between a UE (2110) and RAN node (2120) according to this example.

---

\*\*\* Begin exemplary text for 3GPP TS 38.331 \*\*\*
5.7.3   SCG failure information
5.7.3.1 General
The purpose of this procedure is to inform E-UTRAN or NR MN about an SCG failure the UE has experienced i.e., SCG radio link failure, failure of SCG reconfiguration with sync, SCG configuration failure for RRC message on SRB3, SCG integrity check failure, and consistent uplink LBT failures on PSCell for operation with shared spectrum channel access.
5.7.3.2     Initiation
A UE initiates the procedure to report SCG failures when neither MCG nor SCG transmission is suspended and when one of the following conditions is met:
    1>upon detecting radio link failure for the SCG, in accordance with subclause 5.3.10.3;
    1>upon reconfiguration with sync failure of the SCG, in accordance with subclause 5.3.5.8.3;
    1>upon SCG configuration failure, in accordance with subclause 5.3.5.8.2;
    1>upon integrity check failure indication from SCG lower layers concerning SRB3;
    1>upon beam failure detected for a PSCell as indicated by lower layers when SCG is deactivated and timer T999 is not running.
Upon initiating the procedure, the UE shall:
    1>suspend SCG transmission for all SRBs, DRBs and, if any, BH RLC channels;
    1>reset SCG MAC;
    1>stop T304 for the SCG, if running;
    1>stop conditional reconfiguration evaluation for CPC, if configured;
    1>if the UE is in (NG)EN-DC:
        2>initiate transmission of the SCGFailureInformationNR message as specified in TS 36.331 [10], clause 5.6.13a.
    1>else:
        2>initiate transmission of the SCGFailureInformation message in accordance with 5.7.3.5.
...
5.7.3.5     Actions related to transmission of SCGFailureInformation message
The UE shall set the contents of the SCGFailureInformation message as follows:
    1>if the UE initiates transmission of the SCGFailureInformation message due to T310 expiry:
        2>set the failureType as t310-Expiry;
...
    1>else if the UE initiates transmission of the SCGFailureInformation message due to beam failure detected for a PSCell as indicated by lower layers when SCG is deactivated:
        2>set the failureType as other and set the failureType-v1610 as beamFailureSCG-Deactivated;
...
The UE shall submit the SCGFailureInformation message to lower layers for transmission.
The UE shall:
    1>if the UE initiated transmission of the SCGFailureInformation message due to beam failure detected for a PSCell as indicated by lower layers when SCG is deactivated:
        2>start timer T999;
5.7.3.6     T399 expiry
The UE shall:
    1>if T399 expires:
        2>resubmit the SCGFailureInformation message to lower layers for transmission.
\*\*\* End exemplary text for 3GPP TS 38.331 \*\*\*

Exemplary specification text for 3GPP TS 38.321 is given below, with less relevant portions of the text being omitted for brevity (indicated by ellipses). In this example, upon beam failure detected for a PSCell when SCG is deactivated, the UE MAC layer stops beam failure and indicates the beam failure to the UE RRC layer.

```
*** Begin exemplary text for 3GPP TS 38.321 ***
5.17    Beam Failure Detection and Recovery procedure
...
The MAC entity shall for each Serving Cell configured for beam failure
detection:
    1>if beam failure instance indication has been received from lower
    layers:
        2>start or restart the beamFailureDetectionTimer;
        2>increment BFI_COUNTER by 1;
        2>if BFI_COUNTER >= beamFailureInstanceMaxCount:
            3>if the Serving Cell is SCell:
                4>trigger a BFR for this Serving Cell;
            3>else:
                4>if the serving cell is a PSCell and SCG is deactivated
                    5> stop beam failure detection on the PSCell;
                    5> indicate beam failure of the PSCell to upper layers.
                4>else:
                    5>initiate a Random Access procedure (see clause 5.1) on the
                    SpCell.
...
*** End exemplary text for 3GPP TS 38.321 ***
```

Figure 22:
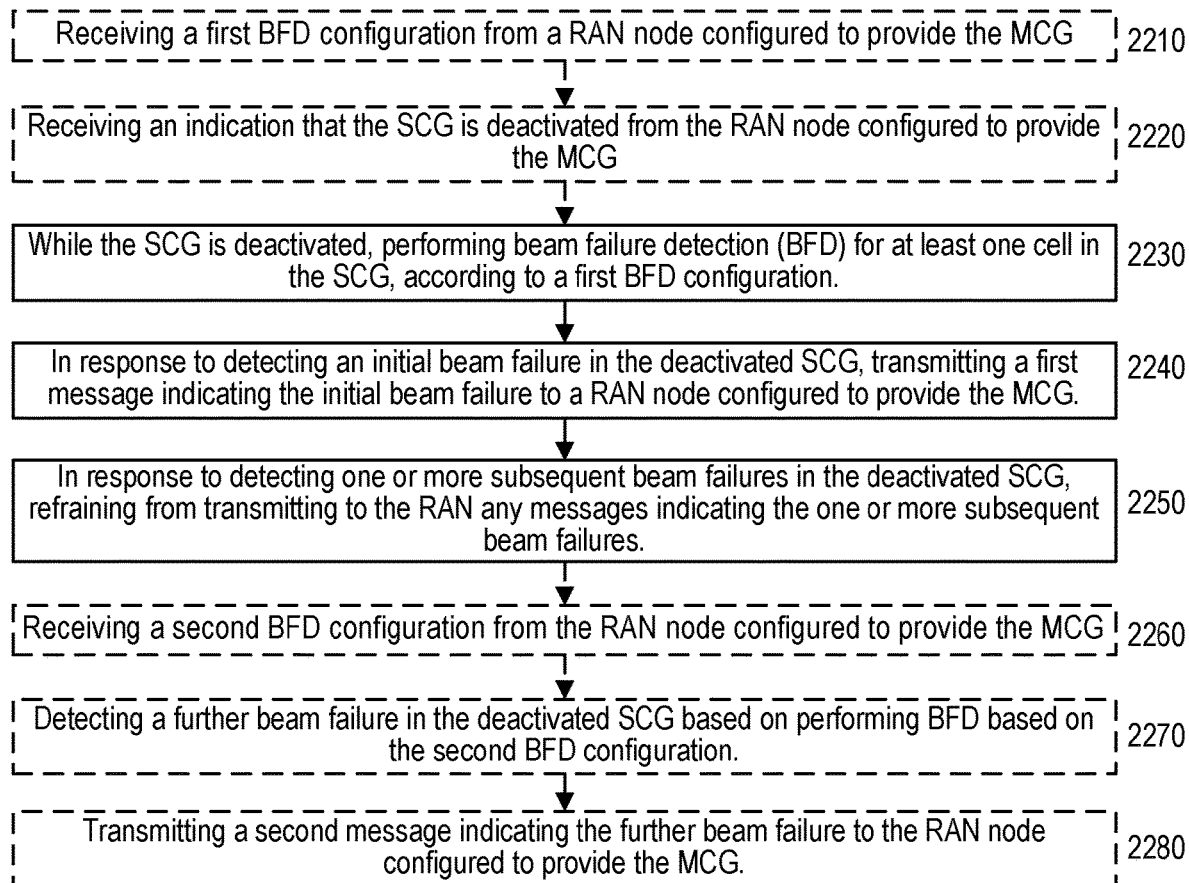
FIG. 22 is a flow diagram of an exemplary method (e.g., procedure) for a UE, according to various embodiments of the present disclosure.
Figure 23:
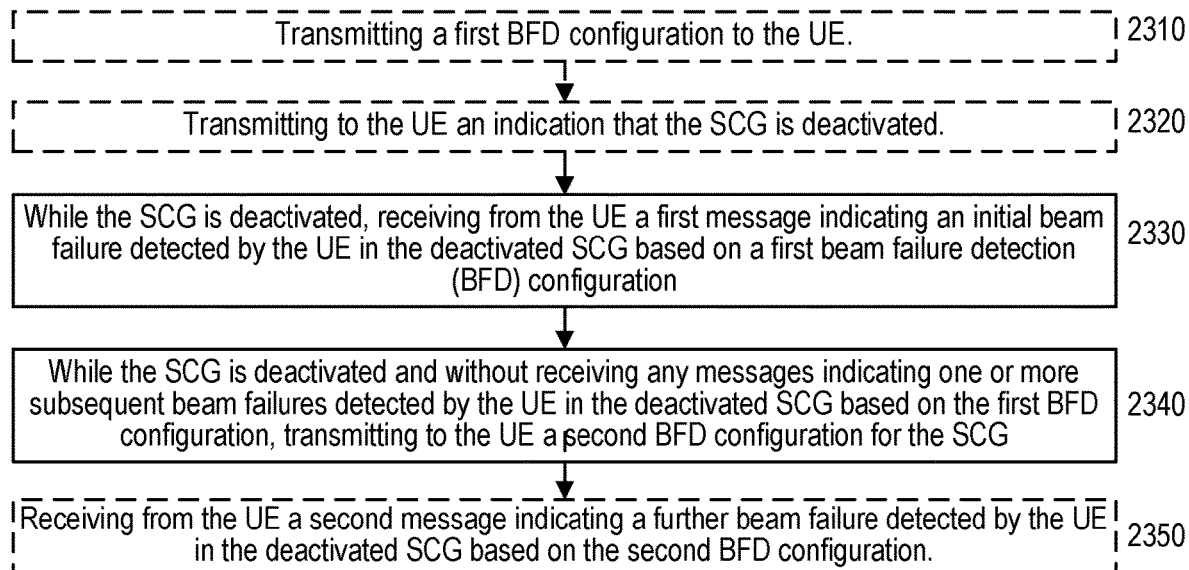
FIG. 23 is a flow diagram of an exemplary method (e.g., procedure) for a RAN node, according to various embodiments of the present disclosure.

The embodiments described above are further illustrated by FIGS. 22-23, which show exemplary methods (e.g., procedures) performed by a UE and a RAN node, respectively. In other words, various features of operations described below correspond to various embodiments described above. These exemplary methods can be used cooperatively to provide various exemplary benefits and/or advantages described herein. Although FIGS. 22-23 show specific blocks in particular orders, the operations of the respective methods can be performed in different orders than shown and can be combined and/or divided into blocks having different functionality than shown. Optional blocks or operations are indicated by dashed lines.

In particular, FIG. 22 shows a flow diagram of an exemplary method (e.g., procedure) for a UE configured to communicate with a RAN via an MCG and an SCG, according to various embodiments of the present disclosure. The exemplary method can be performed by a UE (e.g., wireless device, IoT device, etc. or component thereof) such as described elsewhere herein.

The exemplary method can include operations of block 2230, where while the SCG is deactivated, the UE can perform BFD for at least one cell in the SCG, according to a first BFD configuration. The exemplary method can also include operations of block 2240, where in response to detecting an initial beam failure in the deactivated SCG (i.e., based on the first BFD configuration), the UE can transmit a first message indicating the initial beam failure to a RAN node configured to provide the MCG. The exemplary method can also include the operations of block 2250, where in response to detecting one or more subsequent beam failures (i.e., after the initial beam failure) in the deactivated SCG, the UE can refrain from transmitting to the RAN any messages indicating the one or more subsequent beam failures.

In some embodiments, the UE can refrain from transmitting messages indicating any subsequent beam failures detected in the deactivated SCG after the initial beam failure, until receiving another BFD configuration from the RAN node configured to provide the MCG. In other words, the UE only reports the initial beam failure but not any subsequent beam failures in the deactivated SCG, so long as another BFD configuration has not been received.

In some of these embodiments, the exemplary method can also include the following operations, labelled with corresponding block numbers:

(2260) after detecting the one or more subsequent beam failures, receiving a second BFD configuration from the RAN node configured to provide the MCG;

(2270) detecting a further beam failure in the deactivated SCG based on performing BFD according to the second BFD configuration; and (2280) transmitting a second message indicating the further beam failure to the RAN node configured to provide the MCG.

In some of these embodiments, the second BFD configuration is received from the RAN node in response to transmitting the first message to the RAN node. In some of these embodiments, each of the first and second messages (e.g., transmitted in blocks 2240/2280) is an SCGFailureInformation message including a failure type field that indicates beam failure for deactivated SCG. In some variants, each of the first and second messages includes measurements results for one or more beams, including a beam for which failure was detected.

In some embodiments, the exemplary method can also include the operations of block 2210, where the UE can receive the first BFD configuration from the RAN node configured to provide the MCG. In some embodiments, each of the first and second BFD configurations (e.g., received in blocks 2210/2260) includes one or more of the following settings or parameters:

- an indication of whether the UE should perform BFD on at least one cell in the SCG while the SCG is deactivated;
- an indication of whether the UE should send a message in the MCG upon detecting beam failure for at least one cell in the SCG;
- an indication for the UE to start or stop BFD for the SCG; and
- an indication of which measurement results the UE should include in a message indicating at least one beam failure detected in the SCG.

In some variants, the second BFD configuration includes one or more settings or parameters that differ from corresponding settings or parameters of the first BFD configuration.

In some embodiments, the exemplary method can also include the operations of block 2220, where the UE can receive an indication that the SCG is deactivated from the RAN node configured to provide the MCG. In such case, performing the BFD in block 2230 is responsive to the indication from the RAN node received in block 2220.

In addition, FIG. 23 shows a flow diagram of an exemplary method (e.g., procedure) for a RAN node configured to provide an MCG for a UE also configured with an SCG in the RAN, according to various embodiments of the present disclosure. The exemplary method can be performed by a RAN node (e.g., base station, eNB, gNB, ng-eNB, en-gNB, etc., or components thereof) such as described elsewhere herein.

The exemplary method can include operations of block 2330, where while the SCG is deactivated, the RAN node can receive from the UE a first message indicating an initial beam failure detected by the UE in the deactivated SCG based on a first BFD configuration. The exemplary method can also include operations of block 2340, where while the SCG is deactivated and without receiving any messages indicating one or more subsequent beam failures detected by the UE in the deactivated SCG based on the first BFD configuration, the RAN node can transmit to the UE a second BFD configuration for the SCG.

In some embodiments, the exemplary method can also include the operations of block 2350, where the RAN node can receive from the UE a second message indicating a further beam failure detected by the UE in the deactivated SCG based on the second BFD configuration. In other words, the UE only reports the initial beam failure but not any subsequent beam failures in the deactivated SCG, until after the RAN node sends another BFD configuration (e.g., the second BFD configuration) to the UE.

In some of these embodiments, each of the first and second messages (e.g., received in blocks 2330/2350) is an SCGFailureInformation message including a failure type field that indicates beam failure for deactivated SCG. In some variants, each of the first and second messages includes measurements results for one or more beams, including a beam for which failure was detected.

In some embodiments, the exemplary method can also include the operations of block 2310, where the RAN node can transmit the first BFD configuration to the UE. In some embodiments, each of the first and second BFD configurations (e.g., transmitted in blocks 2310/2340) includes one or more of the following settings or parameters:
  an indication of whether the UE should perform BFD on at least one cell in the SCG while the SCG is deactivated;
  an indication of whether the UE should send a message in the MCG upon detecting beam failure for at least one cell in the SCG;
  an indication for the UE to start or stop BFD for the SCG; and
  an indication of which measurement results the UE should include in a message indicating at least one beam failure detected in the SCG.

In some variants, the second BFD configuration includes one or more settings or parameters that differ from corresponding settings or parameters of the first BFD configuration.

In some embodiments, the second BFD configuration is sent to the UE (e.g., in block 2340) in response to receiving the first message from the UE (e.g., in block 2330).

In some embodiments, the exemplary method can also include the operations of block 2320, where the RAN node can transmit to the UE an indication that the SCG is deactivated. In such case, the first message is received in block 2330 after (e.g., in response to) transmitting the indication in block 2320.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 24:
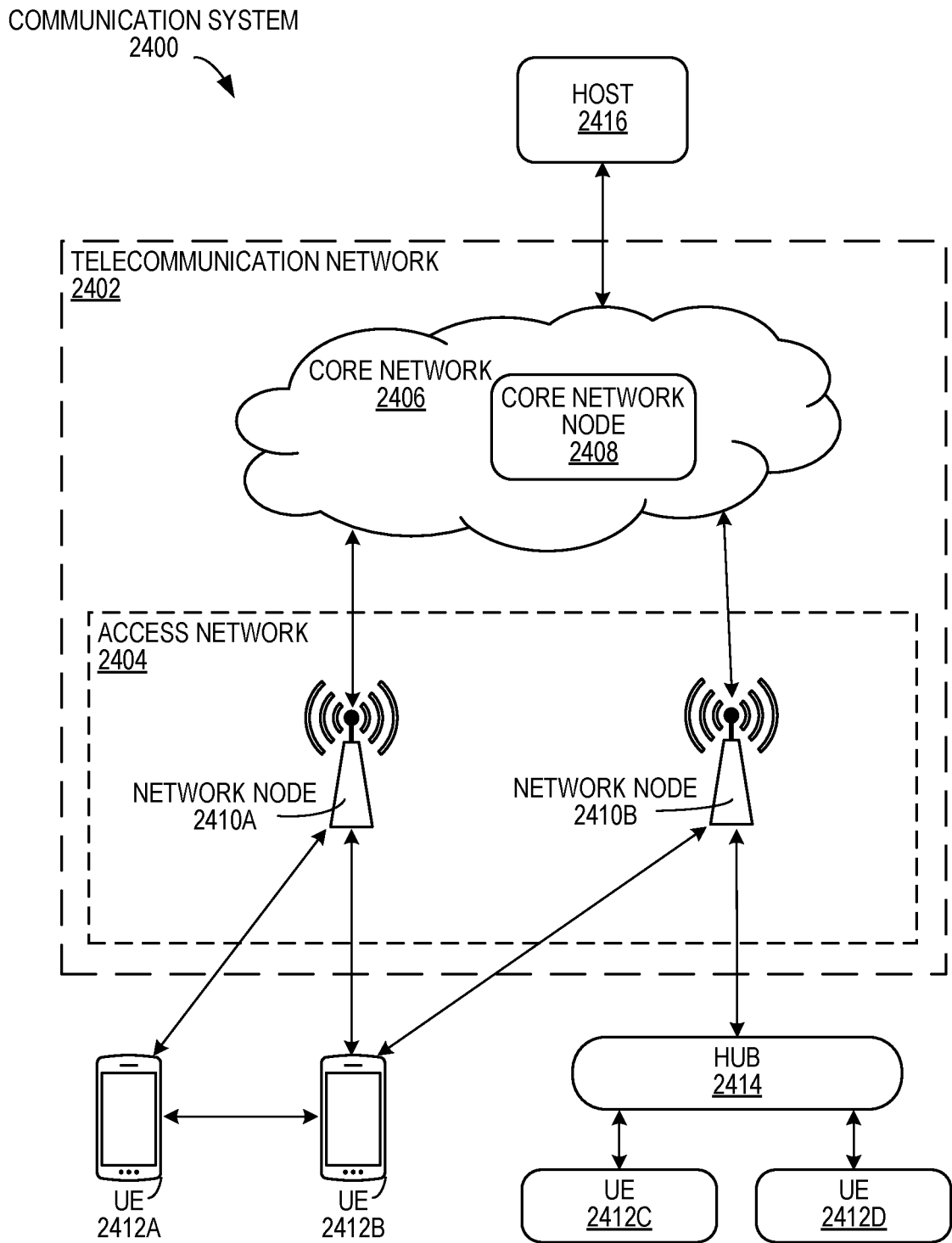
FIG. 24 shows a communication system according to various embodiments of the present disclosure.

FIG. 24 shows an example of a communication system 2400 in accordance with some embodiments. In this example, the communication system 2400 includes a telecommunication network 2402 that includes an access network 2404, such as a radio access network (RAN), and a core network 2406, which includes one or more core network nodes 2408. The access network 2404 includes one or more access network nodes, such as network nodes 2410a and 2410b (one or more of which may be generally referred to as network nodes 2410), or any other similar 3GPP access node or non-3GPP access point. The network nodes 2410 facilitate direct or indirect connection of UEs, such as by connecting UEs 2412a, 2412b, 2412c, and 2412d (one or more of which may be generally referred to as UEs 2412) to the core network 2406 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 2400 may include any number of wired or wireless networks, network nodes, UEs, and/or any other components or systems that may facilitate or participate in the communication of data and/or signals whether via wired or wireless connections. The communication system 2400 may include and/or interface with any type of communication, telecommunication, data, cellular, radio network, and/or other similar type of system.

The UEs 2412 may be any of a wide variety of communication devices, including wireless devices arranged, configured, and/or operable to communicate wirelessly with the network nodes 2410 and other communication devices. Similarly, the network nodes 2410 are arranged, capable, configured, and/or operable to communicate directly or indirectly with the UEs 2412 and/or with other network nodes or equipment in the telecommunication network 2402 to enable and/or provide network access, such as wireless network access, and/or to perform other functions, such as administration in the telecommunication network 2402.

In the depicted example, the core network 2406 connects the network nodes 2410 to one or more hosts, such as host 2416. These connections may be direct or indirect via one or more intermediary networks or devices. In other examples, network nodes may be directly coupled to hosts. The core network 2406 includes one more core network nodes (e.g., core network node 2408) that are structured with hardware and software components. Features of these components may be substantially similar to those described with respect to the UEs, network nodes, and/or hosts, such that the descriptions thereof are generally applicable to the corresponding components of the core network node 2408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 2416 may be under the ownership or control of a service provider other than an operator or provider of the access network 2404 and/or the telecommunication network 2402, and may be operated by the service provider or on behalf of the service provider. The host 2416 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 2400 of FIG. 24 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 2402 is a cellular network that implements 3GPP standardized features. Accordingly, the telecommunications network 2402 may support network slicing to provide different logical networks to different devices that are connected to the telecommunication network 2402. For example, the telecommunications network 2402 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 2412 are configured to transmit and/or receive information without direct human interaction. For instance, a UE may be designed to transmit information to the access network 2404 on a predetermined schedule, when triggered by an internal or external event, or in response to requests from the access network 2404. Additionally, a UE may be configured for operating in single- or multi-RAT or multi-standard mode. For example, a UE May operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 2414 communicates with the access network 2404 to facilitate indirect communication between one or more UEs (e.g., UE 2412c and/or 2412d) and network nodes (e.g., network node 2410b). In some examples, the hub 2414 may be a controller, router, content source and analytics, or any of the other communication devices described herein regarding UEs. For example, the hub 2414 may be a broadband router enabling access to the core network 2406 for the UEs. As another example, the hub 2414 may be a controller that sends commands or instructions to one or more actuators in the UEs. Commands or instructions may be received from the UEs, network nodes 2410, or by executable code, script, process, or other instructions in the hub 2414. As another example, the hub 2414 may be a data collector that acts as temporary storage for UE data and, in some embodiments, may perform analysis or other processing of the data. As another example, the hub 2414 may be a content source. For example, for a UE that is a VR headset, display, loudspeaker or other media delivery device, the hub 2414 may retrieve VR assets, video, audio, or other media or data related to sensory information via a network node, which the hub 2414 then provides to the UE either directly, after performing local processing, and/or after adding additional local content. In still another example, the hub 2414 acts as a proxy server or orchestrator for the UEs, in particular in if one or more of the UEs are low energy IoT devices.

The hub 2414 may have a constant/persistent or intermittent connection to the network node 2410b. The hub 2414 may also allow for a different communication scheme and/or schedule between the hub 2414 and UEs (e.g., UE 2412c and/or 2412d), and between the hub 2414 and the core network 2406. In other examples, the hub 2414 is connected to the core network 2406 and/or one or more UEs via a wired connection. Moreover, the hub 2414 may be configured to connect to an M2M service provider over the access network 2404 and/or to another UE over a direct connection. In some scenarios, UEs may establish a wireless connection with the network nodes 2410 while still connected via the hub 2414 via a wired or wireless connection. In some embodiments, the hub 2414 may be a dedicated hub—that is, a hub whose primary function is to route communications to/from the UEs from/to the network node 2410b. In other embodiments, the hub 2414 may be a non-dedicated hub—that is, a device which can route communications between the UEs and network node 2410b, but which is additionally capable of operating as a communication start and/or end point for certain data channels.

Figure 25:
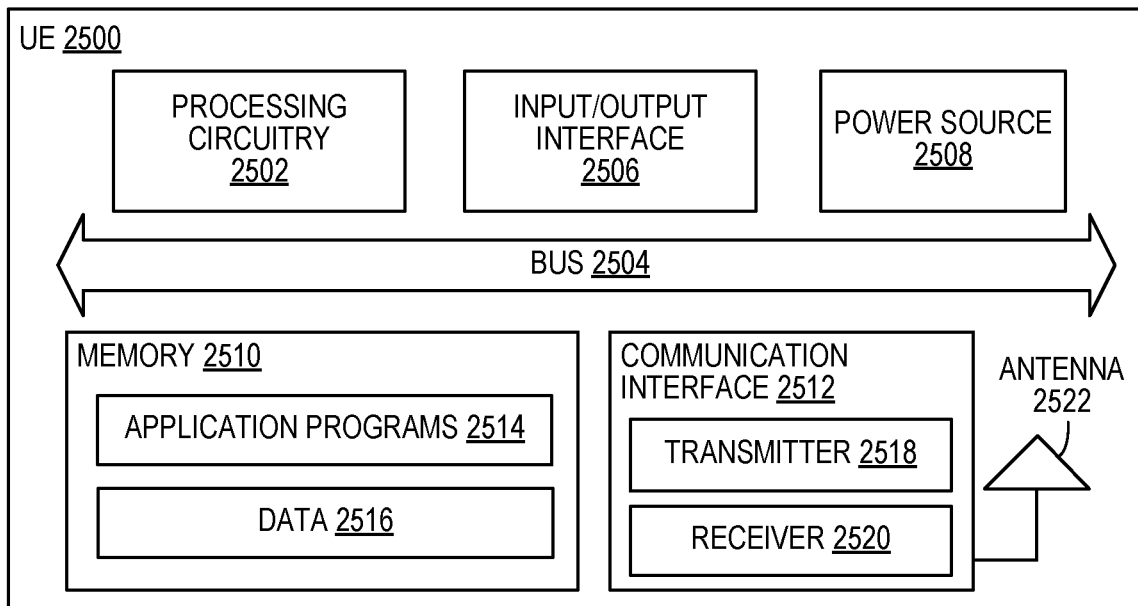
FIG. 25 shows a UE according to various embodiments of the present disclosure.

FIG. 25 shows a UE 2500 in accordance with some embodiments. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2500 includes processing circuitry 2502 that is operatively coupled via a bus 2504 to an input/output interface 2506, a power source 2508, a memory 2510, a communication interface 2512, and/or any other component, or any combination thereof. Certain UEs may utilize all or a subset of the components shown in FIG. 25. The level of integration between the components may vary from one UE to another UE. Further, certain UEs may contain multiple instances of a component, such as multiple processors, memories, transceivers, transmitters, receivers, etc.

The processing circuitry 2502 is configured to process instructions and data and may be configured to implement any sequential state machine operative to execute instructions stored as machine-readable computer programs in the memory 2510. The processing circuitry 2502 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2502 may include multiple central processing units (CPUs).

In the example, the input/output interface 2506 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2500. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2508 is structured as a battery or battery pack. Other types of power sources, such as an external power source (e.g., an electricity outlet), photovoltaic device, or power cell, may be used. The power source 2508 may further include power circuitry for delivering power from the power source 2508 itself, and/or an external power source, to the various parts of the UE 2500 via input circuitry or an interface such as an electrical power cable. Delivering power may be, for example, for charging of the power source 2508. Power circuitry may perform any formatting, converting, or other modification to the power from the power source 2508 to make the power suitable for the respective components of the UE 2500 to which power is supplied.

The memory 2510 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2510 includes one or more application programs 2514, such as an operating system, web browser application, a widget, gadget engine, or other application, and corresponding data 2516. The memory 2510 may store, for use by the UE 2500, any of a variety of various operating systems or combinations of operating systems.

The memory 2510 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2510 may allow the UE 2500 to access instructions, application programs and the like, stored on transitory or non-transitory memory media, to off-load data, or to upload data. An article of manufacture, such as one utilizing a communication system may be tangibly embodied as or in the memory 2510, which may be or comprise a device-readable storage medium.

The processing circuitry 2502 may be configured to communicate with an access network or other network using the communication interface 2512. The communication interface 2512 may comprise one or more communication subsystems and may include or be communicatively coupled to an antenna 2522. The communication interface 2512 may include one or more transceivers used to communicate, such as by communicating with one or more remote transceivers of another device capable of wireless communication (e.g., another UE or a network node in an access network). Each transceiver may include a transmitter 2518 and/or a receiver 2520 appropriate to provide network communications (e.g., optical, electrical, frequency allocations, and so forth). Moreover, the transmitter 2518 and receiver 2520 may be coupled to one or more antennas (e.g., antenna 2522) and may share circuit components, software or firmware, or alternatively be implemented separately.

In the illustrated embodiment, communication functions of the communication interface 2512 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2512, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2500 shown in FIG. 25.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 26:
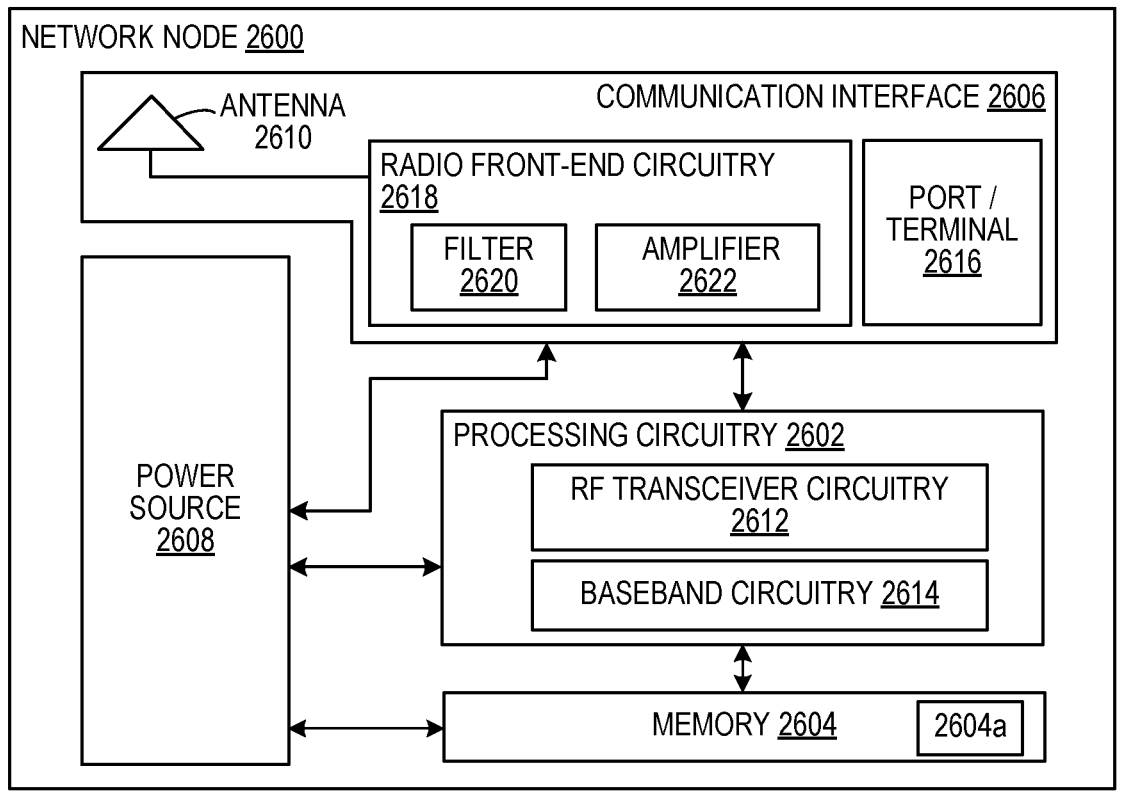
FIG. 26 shows a network node according to various embodiments of the present disclosure.

FIG. 26 shows a network node 2600 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 2600 includes a processing circuitry 2602, a memory 2604, a communication interface 2606, and a power source 2608. The network node 2600 may be composed of multiple physically separate components (e.g., a NodeB component and a RNC component, or a BTS component and a BSC component, etc.), which may each have their own respective components. In certain scenarios in which the network node 2600 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 2600 may be configured to support multiple radio access technologies (RATs). In such embodiments, some components may be duplicated (e.g., separate memory 2604 for different RATs) and some components may be reused (e.g., a same antenna 2610 may be shared by different RATs). The network node 2600 may also include multiple sets of the various illustrated components for different wireless technologies integrated into network node 2600, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 2600.

The processing circuitry 2602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2600 components, such as the memory 2604, to provide network node 2600 functionality.

In some embodiments, the processing circuitry 2602 includes a system on a chip (SOC). In some embodiments, the processing circuitry 2602 includes one or more of radio frequency (RF) transceiver circuitry 2612 and baseband processing circuitry 2614. In some embodiments, the radio frequency (RF) transceiver circuitry 2612 and the baseband processing circuitry 2614 may be on separate chips (or sets of chips), boards, or units, such as radio units and digital units. In alternative embodiments, part or all of RF transceiver circuitry 2612 and baseband processing circuitry 2614 may be on the same chip or set of chips, boards, or units.

The memory 2604 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 2602. The memory 2604 may store any suitable instructions, data, or information, including a computer program, software, an application including one or more of logic, rules, code, tables, and/or other instructions (collectively denoted computer program product 2604*a*) capable of being executed by the processing circuitry 2602 and utilized by the network node 2600. The memory 2604 may be used to store any calculations made by the processing circuitry 2602 and/or any data received via the communication interface 2606. In some embodiments, the processing circuitry 2602 and memory 2604 is integrated.

The communication interface 2606 is used in wired or wireless communication of signaling and/or data between a network node, access network, and/or UE. As illustrated, the communication interface 2606 comprises port(s)/terminal(s) 2616 to send and receive data, for example to and from a network over a wired connection. The communication interface 2606 also includes radio front-end circuitry 2618 that may be coupled to, or in certain embodiments a part of, the antenna 2610. Radio front-end circuitry 2618 comprises filters 2620 and amplifiers 2622. The radio front-end circuitry 2618 may be connected to an antenna 2610 and processing circuitry 2602. The radio front-end circuitry may be configured to condition signals communicated between antenna 2610 and processing circuitry 2602. The radio front-end circuitry 2618 may receive digital data that is to be sent out to other network nodes or UEs via a wireless connection. The radio front-end circuitry 2618 may convert the digital data into a radio signal having the appropriate channel and bandwidth parameters using a combination of filters 2620 and/or amplifiers 2622. The radio signal may then be transmitted via the antenna 2610. Similarly, when receiving data, the antenna 2610 may collect radio signals which are then converted into digital data by the radio front-end circuitry 2618. The digital data may be passed to the processing circuitry 2602. In other embodiments, the communication interface may comprise different components and/or different combinations of components.

In certain alternative embodiments, the network node 2600 does not include separate radio front-end circuitry 2618, instead, the processing circuitry 2602 includes radio front-end circuitry and is connected to the antenna 2610. Similarly, in some embodiments, all or some of the RF transceiver circuitry 2612 is part of the communication interface 2606. In still other embodiments, the communication interface 2606 includes one or more ports or terminals 2616, the radio front-end circuitry 2618, and the RF transceiver circuitry 2612, as part of a radio unit (not shown), and the communication interface 2606 communicates with the baseband processing circuitry 2614, which is part of a digital unit (not shown).

The antenna 2610 may include one or more antennas, or antenna arrays, configured to send and/or receive wireless signals. The antenna 2610 may be coupled to the radio front-end circuitry 2618 and may be any type of antenna capable of transmitting and receiving data and/or signals wirelessly. In certain embodiments, the antenna 2610 is separate from the network node 2600 and connectable to the network node 2600 through an interface or port.

The antenna 2610, communication interface 2606, and/or the processing circuitry 2602 may be configured to perform any receiving operations and/or certain obtaining operations described herein as being performed by the network node. Any information, data and/or signals may be received from a UE, another network node and/or any other network equipment. Similarly, the antenna 2610, the communication interface 2606, and/or the processing circuitry 2602 may be configured to perform any transmitting operations described herein as being performed by the network node. Any information, data and/or signals may be transmitted to a UE, another network node and/or any other network equipment.

The power source 2608 provides power to the various components of network node 2600 in a form suitable for the respective components (e.g., at a voltage and current level needed for each respective component). The power source 2608 may further comprise, or be coupled to, power management circuitry to supply the components of the network node 2600 with power for performing the functionality described herein. For example, the network node 2600 may be connectable to an external power source (e.g., the power grid, an electricity outlet) via an input circuitry or interface such as an electrical cable, whereby the external power source supplies power to power circuitry of the power source 2608. As a further example, the power source 2608 may comprise a source of power in the form of a battery or battery pack which is connected to, or integrated in, power circuitry. The battery may provide backup power should the external power source fail.

Embodiments of the network node 2600 may include additional components beyond those shown in FIG. 26 for providing certain aspects of the network node's functionality, including any of the functionality described herein and/or any functionality necessary to support the subject matter described herein. For example, the network node 2600 may include user interface equipment to allow input of information into the network node 2600 and to allow output of information from the network node 2600. This may allow a user to perform diagnostic, maintenance, repair, and other administrative functions for the network node 2600.

Figure 27:
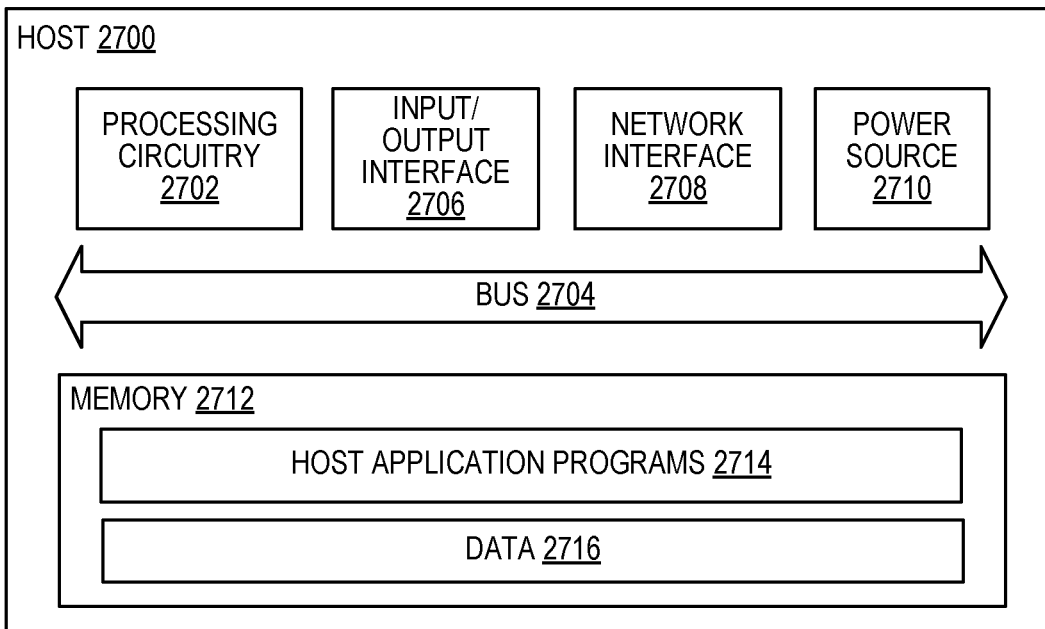
FIG. 27 shows host computing system according to various embodiments of the present disclosure.

FIG. 27 is a block diagram of a host 2700, which may be an embodiment of the host 2416 of FIG. 24, in accordance with various aspects described herein. As used herein, the host 2700 may be or comprise various combinations hardware and/or software, including a standalone server, a blade server, a cloud-implemented server, a distributed server, a virtual machine, container, or processing resources in a server farm. The host 2700 may provide one or more services to one or more UEs.

The host 2700 includes processing circuitry 2702 that is operatively coupled via a bus 2704 to an input/output interface 2706, a network interface 2708, a power source 2710, and a memory 2712. Other components may be included in other embodiments. Features of these components may be substantially similar to those described with respect to the devices of previous figures, such as FIGS. 25 and 26, such that the descriptions thereof are generally applicable to the corresponding components of host 2700.

The memory 2712 may include one or more computer programs including one or more host application programs 2714 and data 2716, which may include user data, e.g., data generated by a UE for the host 2700 or data generated by the host 2700 for a UE. Embodiments of the host 2700 may utilize only a subset or all of the components shown. The host application programs 2714 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 2714 may also provide for user authentication and licensing checks and may periodically report health, routes, and content availability to a central node, such as a device in or on the edge of a core network. Accordingly, the host 2700 may select and/or indicate a different host for over-the-top services for a UE. The host application programs 2714 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 28:
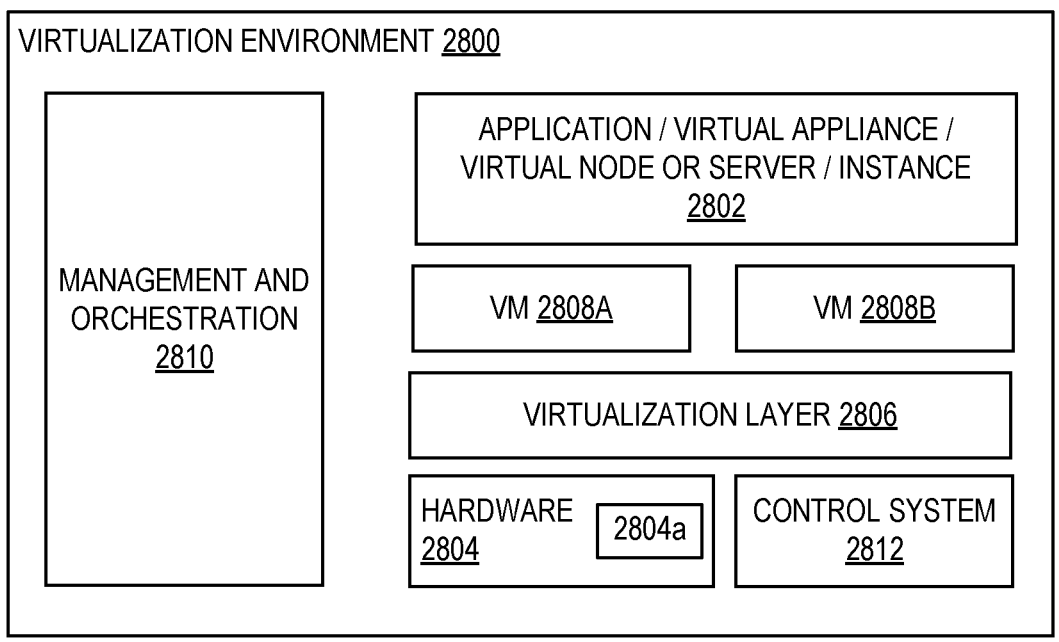
FIG. 28 is a block diagram of a virtualization environment in which functions implemented by some embodiments of the present disclosure may be virtualized.

FIG. 28 is a block diagram illustrating a virtualization environment 2800 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2800 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2802 (which may alternatively be called software instances, virtual appliances, network functions, virtual nodes, virtual network functions, etc.) are run in the virtualization environment 2800 to implement some of the features, functions, and/or benefits of some of the embodiments disclosed herein.

Hardware 2804 includes processing circuitry, memory that stores software and/or instructions (collectively denoted computer program product 2804*a*) executable by hardware processing circuitry, and/or other hardware devices as described herein, such as a network interface, input/output interface, and so forth. Software may be executed by the processing circuitry to instantiate one or more virtualization layers 2806 (also referred to as hypervisors or virtual machine monitors (VMMs)), provide VMs 2808*a* and 2808*b* (one or more of which may be generally referred to as VMs 2808), and/or perform any of the functions, features and/or benefits described in relation with some embodiments described herein. The virtualization layer 2806 may present a virtual operating platform that appears like networking hardware to the VMs 2808.

The VMs 2808 comprise virtual processing, virtual memory, virtual networking or interface and virtual storage, and may be run by a corresponding virtualization layer 2806. Different embodiments of the instance of a virtual appliance 2802 may be implemented on one or more of VMs 2808, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2808 may be a software implementation of a physical machine that runs programs as if they were executing on a physical, non-virtualized machine. Each of the VMs 2808, and that part of hardware 2804 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2808 on top of the hardware 2804 and corresponds to the application 2802.

Hardware 2804 may be implemented in a standalone network node with generic or specific components. Hardware 2804 may implement some functions via virtualization. Alternatively, hardware 2804 may be part of a larger cluster of hardware (e.g., such as in a data center or CPE) where many hardware nodes work together and are managed via management and orchestration 2810, which, among others, oversees lifecycle management of applications 2802. In some embodiments, hardware 2804 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2812 which may alternatively be used for communication between hardware nodes and radio units.

Figure 29:
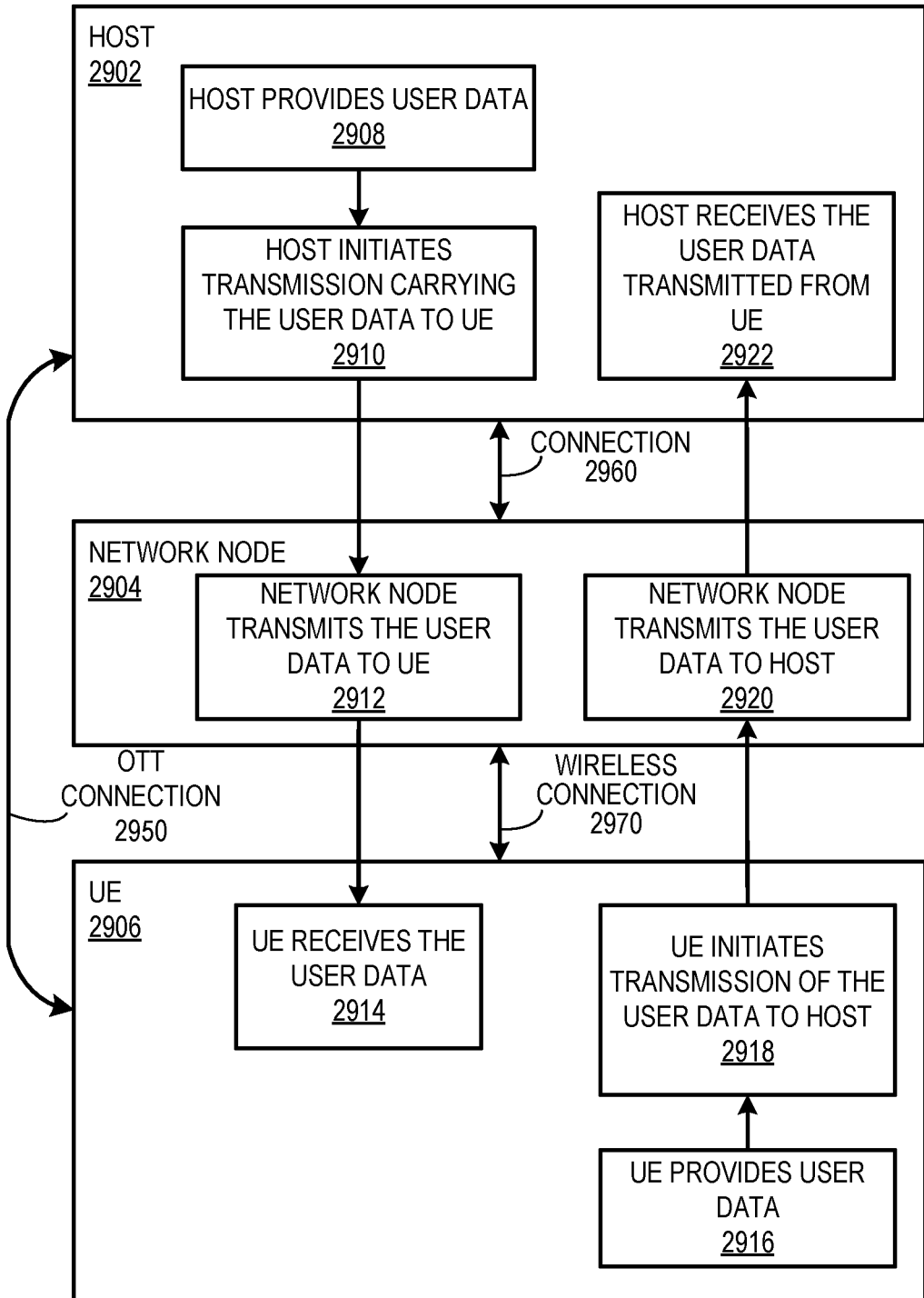
FIG. 29 illustrates communication between a host computing system, a network node, and a UE via multiple connections, at least one of which is wireless, according to various embodiments of the present disclosure.

FIG. 29 shows a communication diagram of a host 2902 communicating via a network node 2904 with a UE 2906 over a partially wireless connection in accordance with some embodiments. Example implementations, in accordance with various embodiments, of the UE (such as a UE 2412*a* of FIG. 24 and/or UE 2500 of FIG. 25), network node (such as network node 2410*a* of FIG. 24 and/or network node 2600 of FIG. 26), and host (such as host 2416 of FIG. 24 and/or host 2700 of FIG. 27) discussed in the preceding paragraphs will now be described with reference to FIG. 29.

Like host 2700, embodiments of host 2902 include hardware, such as a communication interface, processing circuitry, and memory. The host 2902 also includes software, which is stored in or accessible by the host 2902 and executable by the processing circuitry. The software includes a host application that may be operable to provide a service to a remote user, such as the UE 2906 connecting via an over-the-top (OTT) connection 2950 extending between the UE 2906 and host 2902. In providing the service to the remote user, a host application may provide user data which is transmitted using the OTT connection 2950.

The network node 2904 includes hardware enabling it to communicate with the host 2902 and UE 2906. The connection 2960 may be direct or pass through a core network (like core network 2406 of FIG. 24) and/or one or more other intermediate networks, such as one or more public, private, or hosted networks. For example, an intermediate network may be a backbone network or the Internet.

The UE 2906 includes hardware and software, which is stored in or accessible by UE 2906 and executable by the UE's processing circuitry. The software includes a client application, such as a web browser or operator-specific "app" that may be operable to provide a service to a human or non-human user via UE 2906 with the support of the host 2902. In the host 2902, an executing host application may communicate with the executing client application via the OTT connection 2950 terminating at the UE 2906 and host 2902. In providing the service to the user, the UE's client application may receive request data from the host's host application and provide user data in response to the request data. The OTT connection 2950 may transfer both the request data and the user data. The UE's client application may interact with the user to generate the user data that it provides to the host application through the OTT connection 2950.

The OTT connection 2950 may extend via a connection 2960 between the host 2902 and the network node 2904 and via a wireless connection 2970 between the network node 2904 and the UE 2906 to provide the connection between the host 2902 and the UE 2906. The connection 2960 and wireless connection 2970, over which the OTT connection 2950 may be provided, have been drawn abstractly to illustrate the communication between the host 2902 and the UE 2906 via the network node 2904, without explicit reference to any intermediary devices and the precise routing of messages via these devices.

As an example of transmitting data via the OTT connection 2950, in step 2908, the host 2902 provides user data, which may be performed by executing a host application. In some embodiments, the user data is associated with a particular human user interacting with the UE 2906. In other embodiments, the user data is associated with a UE 2906 that shares data with the host 2902 without explicit human interaction. In step 2910, the host 2902 initiates a transmission carrying the user data towards the UE 2906. The host 2902 may initiate the transmission responsive to a request transmitted by the UE 2906. The request may be caused by human interaction with the UE 2906 or by operation of the client application executing on the UE 2906. The transmission may pass via the network node 2904, in accordance with the teachings of the embodiments described throughout this disclosure. Accordingly, in step 2912, the network node 2904 transmits to the UE 2906 the user data that was carried in the transmission that the host 2902 initiated, in accordance with the teachings of the embodiments described throughout this disclosure. In step 2914, the UE 2906 receives the user data carried in the transmission, which may be performed by a client application executed on the UE 2906 associated with the host application executed by the host 2902.

In some examples, the UE 2906 executes a client application which provides user data to the host 2902. The user data may be provided in reaction or response to the data received from the host 2902. Accordingly, in step 2916, the UE 2906 may provide user data, which may be performed by executing the client application. In providing the user data, the client application may further consider user input received from the user via an input/output interface of the UE 2906. Regardless of the specific manner in which the user data was provided, the UE 2906 initiates, in step 2918, transmission of the user data towards the host 2902 via the network node 2904. In step 2920, in accordance with the teachings of the embodiments described throughout this disclosure, the network node 2904 receives user data from the UE 2906 and initiates transmission of the received user data towards the host 2902. In step 2922, the host 2902 receives the user data carried in the transmission initiated by the UE 2906.

One or more of the various embodiments improve the performance of OTT services provided to the UE 2906 using the OTT connection 2950, in which the wireless connection 2970 forms the last segment. For example, since a beam failure condition often occurs for an extended duration, a UE may detect this as multiple beam failure events over the duration. Embodiments enable the UE to report the beam failure condition to the network only once for the duration, or until the network provides a new BFD configuration to the UE. This can reduce the amount of signaling due to beam failures, reduce network load, and reduce UE energy consumption. By improving the performance of UEs and/or RAN nodes in this manner, embodiments can increase the value of OTT services provided via such UEs and/or RAN nodes to both end users and service providers.

In an example scenario, factory status information may be collected and analyzed by the host 2902. As another example, the host 2902 may process audio and video data which may have been retrieved from a UE for use in creating maps. As another example, the host 2902 may collect and analyze real-time data to assist in controlling vehicle congestion (e.g., controlling traffic lights). As another example, the host 2902 may store surveillance video uploaded by a UE. As another example, the host 2902 may store or control access to media content such as video, audio, VR or AR which it can broadcast, multicast or unicast to UEs. As other examples, the host 2902 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2950 between the host 2902 and UE 2906, in response to variations in the measurement results. The measurement procedure and/or the network functionality for reconfiguring the OTT connection may be implemented in software and hardware of the host 2902 and/or UE 2906. In some embodiments, sensors (not shown) may be deployed in or in association with other devices through which the OTT connection 2950 passes; the sensors may participate in the measurement procedure by supplying values of the monitored quantities exemplified above, or supplying values of other physical quantities from which software may compute or estimate the monitored quantities. The reconfiguring of the OTT connection 2950 may include message format, retransmission settings, preferred routing etc.; the reconfiguring need not directly alter the operation of the network node 2904. Such procedures and functionalities may be known and practiced in the art. In certain embodiments, measurements may involve proprietary UE signaling that facilitates measurements of throughput, propagation times, latency and the like, by the host 2902. The measurements may be implemented in that software causes messages to be transmitted, in particular empty or 'dummy' messages, using the OTT connection 2950 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

The techniques and apparatus described herein include, but are not limited to, the following enumerated examples:

A1. A method for a user equipment (UE) configured to communicate with a wireless network via a master cell group (MCG) and a secondary cell group (SCG), the method comprising:
  receiving, from a RAN node configured to provide the MCG, an indication that the SCG is deactivated;
  while the SCG is deactivated, performing beam failure detection (BFD) for at least one cell in the SCG; and
  performing one or more actions based on detecting a beam failure for at least one cell in the SCG.

A2. The method of embodiment A1, wherein performing the one or more actions based on detecting beam failure comprises one or more of the following:
  stopping BFD for the SCG;
  continuing BFD for the SCG;
  detecting a further beam failure in at least one cell of the SCG;
  transmitting to the RAN node one or more messages indicating at least one beam failure detected in the SCG;
  refraining from transmitting a message, or a repetition of a message, indicating a beam failure detected in the SCG;
  receiving a BFD configuration from the RAN node;
  starting a message transmission timer;
  determining whether the message transmission timer is running;
  determining whether the message transmission timer has expired;
  stopping the message transmission timer; and
  incrementing a message transmission counter.

A3. The method of embodiment A2, wherein the one or more actions include stopping the BFD and transmitting a first message indicating beam failure detected in the SCG.

A4. The method of embodiment A3, wherein the one or more actions also include:
  starting the message transmission timer;
  stopping BFD for the SCG while the message transmission timer is running; and
  one of the following after determining the message transmission timer has expired:
    transmitting a repetition of the first message indicating the beam failure detected in the SCG; or
    continuing BFD for the SCG and, based on detecting the further beam failure in at least one cell of the SCG, transmitting a second message indicating the further beam failure.

A5. The method of embodiment A3, wherein the one or more messages indicating beam failure also include a predetermined number of repetitions of the first message, with each repetition being transmitted after a corresponding repetition of the following operations: starting the message transmission timer, determining that the message transmission timer has expired, and incrementing the message transmission counter in response to expiration of the message transmission timer.

A6. The method of embodiment A3, wherein the one or more actions also include:
- stopping the message transmission timer responsive to receiving the BFD configuration from the RAN node after transmitting the first message; and
- refraining from transmitting a repetition of the first message responsive to the message transmission timer being stopped.

A7. The method of embodiment A2, wherein the one or more actions include continuing the BFD and, based on determining that the message transmission timer is not running, transmitting a first message indicating beam failure detected in the SCG.

A8. The method of embodiment A7, wherein continuing BFD for the SCG is based on determining that the message transmission timer is not running.

A9. The method of any of embodiments A7-A8, wherein the one or more actions also include starting the message transmission timer responsive to one of the following:
- detecting the beam failure for at least one cell in the SCG; or
- detecting the further beam failure for at least one cell in the SCG, determining that the message transmission timer is not running, and determining that the message transmission timer has not expired.

A10. The method of any of embodiments A7-A9, wherein the one or more actions also include stopping the message transmission timer responsive to one of the following:
- receiving the BFD when the message transmission timer is running; or
- determining that the message transmission timer is running.

A11. The method of any of embodiments A9-A10, wherein the one or more actions include:
- detecting the further beam failure in at least one cell of the SCG; and
- transmitting a second message indicating the further beam failure based on detecting that the timer has expired.

A12. The method of any of embodiments A2-A11, wherein each of the one or more messages is an SCGFailureInformation message including a failure type field that indicates beam failure for deactivated SCG.

A13. The method of any of embodiments A2-A12, wherein each of the one or more messages includes measurements results for one or more beams, including a beam for which failure was detected.

A14. The method of any of embodiments A2-A13, wherein the BFD configuration includes one or more of the following settings or parameters:
- an indication of whether the UE should perform BFD on at least one cell in the SCG while the SCG is deactivated;
- an indication of whether the UE should send a message in the MCG upon detecting beam failure for at least one cell in the SCG;
- an initial value for a message transmission timer associated with detecting beam failure for at least one cell in the SCG;
- a threshold for a message transmission counter associated with detecting beam failure for at least one cell in the SCG;
- an indication for the UE to start or stop BFD for the SCG; and
- an indication of which measurement results the UE should include in a message indicating at least one beam failure detected in the SCG.

A15. The method of embodiments A14, wherein:
- the method further comprises receiving a first BFD configuration from the RAN node;
- performing BFD while the SCG is deactivated is based on the first BFD configuration;
- a second BFD is received from the RAN node based on detecting a beam failure for at least one cell in the SCG; and
- the second BFD includes one or more settings or parameters that differ from corresponding settings or parameters of the first BFD configuration.

A16. The method of embodiment A15, wherein the second BFD is received from the RAN node responsive to transmitting to the RAN node a message indicating at least one beam failure detected in the SCG.

B1. A method for a radio access network (RAN) node configured to provide a master cell group (MCG) for a user equipment (UE) also configured with a secondary cell group (SCG) in the RAN, the method comprising:
- transmitting to the UE an indication that the SCG is deactivated;
- while the SCG is deactivated, receiving from the UE node one or more messages indicating at least one beam failure detected in the SCG; and
- responsive to at least one of the messages, transmitting to the UE a beam failure detection (BFD) configuration for the SCG.

B2. The method of embodiment B1, wherein the one or more messages include a first message indicating a beam failure detected in the SCG.

B3. The method of embodiment B2, wherein the one or more messages also include:
- a repetition of the first message indicating the beam failure detected in the SCG; or
- a second message indicating a further beam failure detected in the SCG.

B4. The method of embodiment B3, wherein the one or more messages include a predetermined number of repetitions of the first message.

B5. The method of any of embodiments B2-B4, wherein:
- the BFD configuration is transmitted to the UE responsive to receiving the first message; and
- no repetitions of the first message are received after transmitting the BFD configuration.

B6. The method of any of embodiments B1-B5, wherein each of the one or more messages is an SCGFailureInformation message including a failure type field that indicates beam failure for deactivated SCG.

B7. The method of embodiment B6, wherein each of the one or more messages includes measurements results for one or more beams, including a beam for which failure was detected.

B8. The method of any of embodiments B1-B7, wherein the BFD configuration includes one or more of the following settings or parameters:
- an indication of whether the UE should perform BFD on at least one cell in the SCG while the SCG is deactivated;
- an indication of whether the UE should send a message in the MCG upon detecting beam failure for at least one cell in the SCG;
- an initial value for a message transmission timer associated with detecting beam failure for at least one cell in the SCG;
- a threshold for a message transmission counter associated with detecting beam failure for at least one cell in the SCG;

an indication for the UE to start or stop BFD for the SCG; and an indication of which measurement results the UE should include in a message indicating at least one beam failure detected in the SCG.

B9. The method of embodiment B8, wherein:

the method further comprises transmitting a first BFD configuration to the UE before receiving the one or more messages;

the one or more messages indicate at least one beam failure detected based on the first BFD configuration;

a second BFD is transmitted to the UE responsive to at least one of the messages; and the second BFD includes one or more settings or parameters that differ from corresponding settings or parameters of the first BFD configuration.

C1. A user equipment (UE) configured to communicate with a wireless network via a master cell group (MCG) and a secondary cell group (SCG), the UE comprising:

radio transceiver circuitry configured to communicate with the wireless network via the SCG and a master cell group (MCG); and processing circuitry operatively coupled to the radio transceiver circuitry, whereby the processing circuitry and the radio transceiver circuitry are configured to perform operations corresponding to any of the methods of embodiments A1-A16.

C2. A user equipment (UE) to communicate with a wireless network via a master cell group (MCG) and a secondary cell group (SCG), the UE being further arranged to perform operations corresponding to any of the methods of embodiments A1-A16.

C3. A non-transitory, computer-readable medium storing computer-executable instructions that, when executed by processing circuitry of a user equipment (UE) arranged to communicate with a wireless network via a master cell group (MCG) and a secondary cell group (SCG), configure the UE to perform operations corresponding to any of the methods of embodiments A1-A16.

C4. A computer program product comprising computer-executable instructions that, when executed by processing circuitry of a user equipment (UE) arranged to communicate with a wireless network via a master cell group (MCG) and a secondary cell group (SCG), configure the UE to perform operations corresponding to any of the methods of embodiments A1-A16.

D1. A radio access network (RAN) node configured to provide a master cell group (MCG) for a user equipment (UE) also configured with a secondary cell group (SCG) in the RAN, the RAN node comprising:

communication interface circuitry configured to communicate with the UE via the MCG; and processing circuitry operatively coupled to the communication interface circuitry, whereby the processing circuitry and the communication interface circuitry are configured to perform operations corresponding to any of the methods of embodiments B1-B9.

D2. A radio access network (RAN) node configured to provide a master cell group (MCG) for a user equipment (UE) also configured with a secondary cell group (SCG) in the RAN, the RAN node being further configured to perform operations corresponding to any of the methods of embodiments B1-B9.

D3. A non-transitory, computer-readable medium storing computer-executable instructions that, when executed by processing circuitry of a radio access network (RAN) node configured to provide a master cell group (MCG) for a user equipment (UE) also configured with a secondary cell group (SCG) in the RAN, configure the RAN node to perform operations corresponding to any of the methods of embodiments B1-B9.

D4. A computer program product comprising computer-executable instructions that, when executed by processing circuitry of a radio access network (RAN) node configured to provide a master cell group (MCG) for a user equipment (UE) also configured with a secondary cell group (SCG) in the RAN, configure the RAN node to perform operations corresponding to any of the methods of embodiments B1-B9.

The invention claimed is:

1. A method performed by a user equipment (UE) configured to communicate with a radio access network (RAN) via a master cell group (MCG) and a secondary cell group (SCG), the method comprising:

while the SCG is deactivated, performing beam failure detection (BFD) for at least one cell in the SCG, according to a first BFD configuration;

in response to detecting an initial beam failure in the deactivated SCG, transmitting a first message indicating the initial beam failure to a RAN node configured to provide the MCG; and in response to detecting one or more subsequent beam failures in the deactivated SCG after the initial beam failure, refraining from transmitting to the RAN any messages indicating the one or more subsequent beam failures until receiving another BFD configuration from the RAN node configured to provide the MCG.

2. The method of claim 1, further comprising:

after detecting the one or more subsequent beam failures, receiving a second BFD configuration from the RAN node configured to provide the MCG;

detecting a further beam failure in the deactivated SCG based on performing BFD according to the second BFD configuration; and transmitting a second message indicating the further beam failure to the RAN node configured to provide the MCG.

3. The method of claim 2, wherein the second BFD configuration is received from the RAN node in response to transmitting the first message to the RAN node.

4. The method of claim 2, wherein each of the first and second messages is an SCGFailureInformation message including a failure type field that indicates beam failure for deactivated SCG.

5. The method of claim 2, wherein each of the first and second messages includes measurements results for one or more beams, including a beam for which failure was detected.

6. The method of claim 2, wherein each of the first and second BFD configurations includes one or more of the following settings or parameters:

an indication of whether the UE should perform BFD on at least one cell in the SCG while the SCG is deactivated;

an indication of whether the UE should send a message in the MCG upon detecting beam failure for at least one cell in the SCG;

an indication for the UE to start or stop BFD for the SCG; and an indication of which measurement results the UE should include in a message indicating at least one beam failure detected in the SCG.

7. The method of claim 2, wherein the second BFD configuration includes one or more settings or parameters that differ from corresponding settings or parameters of the first BFD configuration.

8. The method of claim 1, further comprising receiving an indication that the SCG is deactivated from the RAN node configured to provide the MCG, wherein performing the BFD is responsive to the indication from the RAN node.

9. A user equipment (UE) configured to communicate with a radio access network (RAN) via a master cell group (MCG) and a secondary cell group (SCG), the UE comprising:
   communication interface circuitry configured to communicate with the RAN via the SCG and the MCG; and
   processing circuitry operatively coupled to the communication interface circuitry, wherein the processing circuitry and the communication interface circuitry are configured to:
      while the SCG is deactivated, perform beam failure detection (BFD) for at least one cell in the SCG, according to a first BFD configuration;
      in response to detecting an initial beam failure in the deactivated SCG, transmit a first message indicating the initial beam failure to a RAN node configured to provide the MCG; and
      in response to detecting one or more subsequent beam failures in the deactivated SCG after the initial beam failure, refrain from transmitting to the RAN any messages indicating the one or more subsequent beam failures until receiving another BFD configuration from the RAN node configured to provide the MCG.

10. The UE of claim 9, wherein the processing circuitry and the communication interface circuitry are further configured to:
   after detecting the one or more subsequent beam failures, receive a second BFD configuration from the RAN node configured to provide the MCG;
   detect a further beam failure in the deactivated SCG based on performing BFD according to the second BFD configuration; and
   transmit a second message indicating the further beam failure to the RAN node configured to provide the MCG.

11. The UE of claim 10, wherein the processing circuitry and the communication interface circuitry are further configured to receive the second BFD configuration from the RAN node in response to transmitting the first message to the RAN node.

12. The UE of claim 10, wherein each of the first and second messages is an SCGFailureInformation message including a failure type field that indicates beam failure for deactivated SCG.

13. The UE of claim 10, wherein each of the first and second messages includes measurements results for one or more beams, including a beam for which failure was detected.

14. The UE of claim 10, wherein each of the first and second BFD configurations includes one or more of the following settings or parameters:
   an indication of whether the UE should perform BFD on at least one cell in the SCG while the SCG is deactivated;
   an indication of whether the UE should send a message in the MCG upon detecting beam failure for at least one cell in the SCG;
   an indication for the UE to start or stop BFD for the SCG; and
   an indication of which measurement results the UE should include in a message indicating at least one beam failure detected in the SCG.

15. The UE of claim 10, wherein the second BFD configuration includes one or more settings or parameters that differ from corresponding settings or parameters of the first BFD configuration.

16. The UE of claim 9, wherein the processing circuitry and the communication interface circuitry are further configured to:
   receive an indication that the SCG is deactivated from the RAN node configured to provide the MCG; and
   perform the BFD responsive to the indication received from the RAN node.

17. A non-transitory, computer-readable medium storing computer-executable instructions that, when executed by processing circuitry of a user equipment (UE) configured to communicate with a radio access network (RAN) via a master cell group (MCG) and a secondary cell group (SCG), configure the UE to:
   while the SCG is deactivated, perform beam failure detection (BFD) for at least one cell in the SCG, according to a first BFD configuration;
   in response to detecting an initial beam failure in the deactivated SCG, transmit a first message indicating the initial beam failure to a RAN node configured to provide the MCG; and
   in response to detecting one or more subsequent beam failures in the deactivated SCG after the initial beam failure, refrain from transmitting to the RAN any messages indicating the one or more subsequent beam failures until receiving another BFD configuration from the RAN node configured to provide the MCG.

18. The non-transitory, computer-readable medium of claim 17, further comprising instructions that, when executed by the processing circuitry, configure the UE to:
   after detecting the one or more subsequent beam failures, receive a second BFD configuration from the RAN node configured to provide the MCG;
   detect a further beam failure in the deactivated SCG based on performing BFD according to the second BFD configuration; and
   transmit a second message indicating the further beam failure to the RAN node configured to provide the MCG.

19. The non-transitory, computer-readable medium of claim 18, wherein execution of the instructions by the processing circuitry configure the UE to receive the second BFD configuration from the RAN node in response to transmitting the first message to the RAN node.

20. The non-transitory, computer-readable medium of claim 18, wherein one or more of the following applies:
   each of the first and second messages is an SCGFailureInformation message including a failure type field that indicates beam failure for deactivated SCG; and
   each of the first and second messages includes measurements results for one or more beams, including a beam for which failure was detected.

* * * * *